(12) United States Patent
Tang

(10) Patent No.: US 10,929,630 B2
(45) Date of Patent: Feb. 23, 2021

(54) GRAPHIC CODE DISPLAY METHOD AND APPARATUS

(71) Applicant: ADVANCED NEW TECHNOLOGIES CO., LTD., Grand Cayman (KY)

(72) Inventor: Zhihui Tang, Hangzhou (CN)

(73) Assignee: ADVANCED NEW TECHNOLOGIES CO., LTD., Grand Cayman (KY)

(*) Notice: Subject to any disclaimer, the term of this patent is extended or adjusted under 35 U.S.C. 154(b) by 0 days.

(21) Appl. No.: 16/875,937

(22) Filed: May 15, 2020

(65) Prior Publication Data

US 2020/0279085 A1    Sep. 3, 2020

Related U.S. Application Data

(63) Continuation of application No. PCT/CN2020/071278, filed on Jan. 10, 2020.

(30) Foreign Application Priority Data

Jun. 4, 2019 (CN) .......................... 201910482293.4

(51) Int. Cl.
 *G06K 7/14* (2006.01)
 *G06K 7/10* (2006.01)
 *G06K 19/06* (2006.01)

(52) U.S. Cl.
 CPC .......... *G06K 7/146* (2013.01); *G06K 7/1095* (2013.01); *G06K 19/06009* (2013.01)

(58) Field of Classification Search
 CPC .......................... G06K 7/146; G06Q 30/0239
 (Continued)

(56) References Cited

U.S. PATENT DOCUMENTS

| 2004/0118923 A1 | 6/2004 | Creamer et al. |
| 2007/0038735 A1 | 2/2007 | Tsunoda et al. |

(Continued)

FOREIGN PATENT DOCUMENTS

| CN | 106228221 A | 12/2016 |
| CN | 107633398 A | 1/2018 |

(Continued)

OTHER PUBLICATIONS

First Office Action for Chinese Application No. 201910482293.4, dated May 21, 2020, 7 pages.

(Continued)

*Primary Examiner* — Allyson N Trail

(57) ABSTRACT

A method includes: determining, by a graphic code display device, a first tilted angle of an affine plane of the graphic code displayed by the graphic code display device relative to a horizontal plane; obtaining, by the graphic code display device, a prestored second tilted angle of a scanning window plane of a scanning device relative to the horizontal plane, wherein the graphic code is displayed for the scanning device to scan; and adjusting, by the graphic code display device according to the first tilted angle and the second tilted angle, the first tilted angle of the affine plane of the graphic code to reduce an angle between the affine plane of the graphic code and the scanning window plane of the scanning device. Adjusting the first tilted angle of the affine plane of the graphic code stretches the graphic code.

20 Claims, 7 Drawing Sheets

(58) Field of Classification Search
USPC .......................................................... 235/470
See application file for complete search history.

(56) References Cited

U.S. PATENT DOCUMENTS

| | | |
|---|---|---|
| 2009/0024477 A1 | 1/2009 | Kramer et al. |
| 2010/0225580 A1 | 9/2010 | Yoon et al. |
| 2012/0067944 A1 | 3/2012 | Ross |
| 2012/0249792 A1 | 10/2012 | Wilborn |
| 2013/0332995 A1 | 12/2013 | Bultman |
| 2014/0022285 A1 | 1/2014 | Stovicek et al. |
| 2014/0310643 A1 | 10/2014 | Karmanenko et al. |
| 2016/0163288 A1 | 6/2016 | Ushijima |
| 2016/0239284 A1 | 8/2016 | Boudville |
| 2016/0328590 A1 | 11/2016 | Fefferman |
| 2017/0337028 A1* | 11/2017 | Fan ........................ G06F 3/0346 |
| 2017/0337456 A1 | 11/2017 | Chang et al. |
| 2018/0157884 A1 | 6/2018 | Visentin et al. |
| 2020/0084370 A1 | 3/2020 | Shen et al. |
| 2020/0111117 A1* | 4/2020 | Xiao ................... G06Q 20/3276 |

FOREIGN PATENT DOCUMENTS

| | | |
|---|---|---|
| CN | 107944321 A | 4/2018 |
| CN | 109146469 A | 1/2019 |
| CN | 109615360 A | 4/2019 |
| CN | 109711226 A | 5/2019 |
| CN | 110334554 A | 10/2019 |

OTHER PUBLICATIONS

Second Office Action for Chinese Application No. 201910482293.4, dated Jun. 24, 2020, 8 pages.
Search Report for Chinese Application No. 201910482293.4, dated May 14, 2020.
Written Opinion and International Search Report for PCT Application No. PCT/CN2020/071278 made available to public dated Dec. 12, 2020.

* cited by examiner

GRAPHIC CODE DISPLAY METHOD AND APPARATUS

CROSS REFERENCE TO RELATED APPLICATIONS

This application is a continuation application of International Application No. PCT/CN2020/071278, filed on Jan. 10, 2020, which claims priority to and benefits of Chinese Patent Application No. 201910482293.4 filed on Jun. 4, 2019. The contents of the above-referenced applications are incorporated herein by reference in their entirety.

TECHNICAL FIELD

The present specification relates to the field of graphic code technologies, and in particular, to a graphic code display method and apparatus.

BACKGROUND

With the rapid development of information technology, graphic codes such as a quick response code and a bar code have been widely used in various scenarios and fields, such as school access control, school canteen, community access control, and travel on a subway or bus. However, in some scenarios, a scanning device in use is relatively old, and a graphic code recognition algorithm on the scanning device is unable to be upgraded or optimized. Consequently, the capability of the scanning device in recognizing a graphic code is weak. In some cases, if a graphic code display device is not placed at a proper angle, the recognition of the graphic code may fail. As a result, the success rate of scanning codes is low, or it takes a long time to complete the recognition of a graphic code, which affects user experience.

Therefore, a technical solution to displaying a graphic code is urgently needed to improve the scanning success rate of the scanning device or reduce consumption of scanning time.

SUMMARY

Embodiments of the present specification are directed to provide a graphic code display method and apparatus. When a code is scanned by a scanning device, a first tilted angle of an affine plane of a graphic code currently displayed by a graphic code display device relative to a horizontal plane is determined; a prestored second tilted angle of a scanning window plane of a scanning device relative to the horizontal plane is obtained; and an angle of the affine plane of the graphic code is adjusted according to the first tilted angle and the second tilted angle to reduce an angle between the affine plane of the graphic code and the scanning window plane. In this way, after the scanning device scans the graphic code, the graphic code can be recognized without greatly adjusting the angle of the graphic code, thereby reducing requirements imposed on the scanning device, improving the scanning success rate of the scanning device and reducing the scanning time consumed by the scanning device, and improving user experience.

To resolve the above technical problems, the embodiments of the present specification are implemented in the following way:

The embodiments of the present specification provide a graphic code display method, including: determining a first tilted angle of an affine plane of a graphic code currently displayed by a graphic code display device relative to a horizontal plane; obtaining a prestored second tilted angle of a scanning window plane of a scanning device relative to the horizontal plane; and adjusting an angle of the affine plane of the graphic code according to the first tilted angle and the second tilted angle to reduce an angle between the affine plane of the graphic code and the scanning window plane of the scanning device.

The embodiments of the present specification further provide a graphic code display apparatus, including: a determining module, configured to determine a first tilted angle of an affine plane of a graphic code currently displayed by a graphic code display device relative to a horizontal plane; an obtaining module, configured to obtain a prestored second tilted angle of a scanning window plane of a scanning device relative to the horizontal plane; and an adjustment module, configured to adjust an angle of the affine plane of the graphic code according to the first tilted angle and the second tilted angle to reduce an angle between the affine plane of the graphic code and the scanning window plane of the scanning device to a second angle value, where the second angle value is less than the first angle value.

The embodiments of the present specification further provide a graphic code display device, including: a processor, and a memory arranged to store computer-executable instructions that, when executed, cause the processor to: determine a first tilted angle of an affine plane of a graphic code currently displayed by a graphic code display device relative to a horizontal plane; obtain a prestored second tilted angle of a scanning window plane of a scanning device relative to the horizontal plane; and adjust an angle of the affine plane of the graphic code according to the first tilted angle and the second tilted angle to reduce an angle between the affine plane of the graphic code and the scanning window plane of the scanning device.

The embodiments of the present specification further provide a storage medium, configured to store computer-executable instructions that, when executed by a processor, cause the processor to perform operations comprising: determining a first tilted angle of an affine plane of a graphic code currently displayed by a graphic code display device relative to a horizontal plane; obtaining a prestored second tilted angle of a scanning window plane of a scanning device relative to the horizontal plane; and adjusting an angle of the affine plane of the graphic code according to the first tilted angle and the second tilted angle to reduce an angle between the affine plane of the graphic code and the scanning window plane of the scanning device.

The embodiments of the present specification further provide a method for displaying a graphic code. According to some embodiments, the method includes: determining, by a graphic code display device, a first tilted angle of an affine plane of the graphic code displayed by the graphic code display device relative to a horizontal plane; obtaining, by the graphic code display device, a prestored second tilted angle of a scanning window plane of a scanning device relative to the horizontal plane, wherein the graphic code is displayed for the scanning device to scan; and adjusting, by the graphic code display device according to the first tilted angle and the second tilted angle, the first tilted angle of the affine plane of the graphic code to reduce an angle between the affine plane of the graphic code and the scanning window plane of the scanning device. Adjusting the first tilted angle of the affine plane of the graphic code stretches the graphic code.

The embodiments of the present specification further provide an apparatus for displaying a graphic code. According to some embodiments, the apparatus includes one or more processors and a memory storing instructions executable by the one or more processors to causes the one or more processors to perform operations including: determining a first tilted angle of an affine plane of the graphic code displayed by a graphic code display device relative to a horizontal plane; obtaining a prestored second tilted angle of a scanning window plane of a scanning device relative to the horizontal plane, wherein the graphic code is displayed for the scanning device to scan; and adjusting, according to the first tilted angle and the second tilted angle, the first tilted angle of the affine plane of the graphic code to reduce an angle between the affine plane of the graphic code and the scanning window plane of the scanning device. Adjusting the first tilted angle of the affine plane of the graphic code stretches the graphic code.

In some embodiments, the first tilted angle is an angle clockwise from the horizontal plane to the affine plane, and the second tilted angle is an angle clockwise from the horizontal plane to the scanning window plane. The adjusting, according to the first tilted angle and the second tilted angle, the first tilted angle of the affine plane of the graphic code includes: determining an angle difference by subtracting the second tilted angle from the first tilted angle, and adjusting, according to the angle difference, the first tilted angle of the affine plane of the graphic code.

In some embodiments, the first tilted angle is an angle counterclockwise from the horizontal plane to the affine plane, and the second tilted angle is an angle counterclockwise from the horizontal plane to the scanning window plane. The adjusting, according to the first tilted angle and the second tilted angle, the first tilted angle of the affine plane of the graphic code includes: determining an angle difference by subtracting the second tilted angle from the first tilted angle, and adjusting, according to the determined angle difference, the first tilted angle of the affine plane of the graphic code.

In some embodiments, when the first tilted angle is an angle clockwise from the horizontal plane to the affine plane, and the second tilted angle is an angle clockwise from the horizontal plane to the scanning window plane, the adjusting, according to the angle difference, the first tilted angle of the affine plane of the graphic code includes: rotating, if the angle difference is a positive value, the affine plane of the graphic code counterclockwise to reduce the first tilted angle of the affine plane; or, if the angle difference is a negative value, rotating the affine plane of the graphic code clockwise to increase the first tilted angle of the affine plane clockwise.

In some embodiments, when the first tilted angle is an angle counterclockwise from the horizontal plane to the affine plane, and the second tilted angle is an angle counterclockwise from the horizontal plane to the scanning window plane, the adjusting, according to the angle difference, the first tilted angle of the affine plane of the graphic code includes: rotating, if the angle difference is a positive value, the affine plane of the graphic code clockwise to reduce the first tilted angle of the affine plane; or, if the angle difference is a negative value, rotating the affine plane of the graphic code counterclockwise to increase the first tilted angle of the affine plane.

In some embodiments, when the first tilted angle is an angle clockwise from the horizontal plane to the affine plane, and the second tilted angle is an angle clockwise from the horizontal plane to the scanning window plane, the adjusting, according to the determined angle difference, the first tilted angle of the affine plane of the graphic code includes: rotating, if the determined angle difference is a positive value, the affine plane of the graphic code counterclockwise by the angle difference; or, rotating, if the determined angle difference is a negative value, the affine plane of the graphic code clockwise by the determined angle difference.

In some embodiments, when the first tilted angle is an angle counterclockwise from the horizontal plane to the affine plane, and the second tilted angle is an angle counterclockwise from the horizontal plane to the scanning window plane, the adjusting, according to the determined angle difference, the first tilted angle of the affine plane of the graphic code includes: rotating, if the angle difference is a positive value, the affine plane of the graphic code clockwise by the determined angle difference; or, rotating, if the angle difference is a negative value, the affine plane of the graphic code counterclockwise by the angle difference.

In some embodiments, before the adjusting, according to the first tilted angle and the second tilted angle, the first tilted angle of the affine plane of the graphic code, the method further includes: determining whether the angle difference is greater than or equal to a preset threshold. The adjusting, according to the first tilted angle and the second tilted angle, the first tilted angle of the affine plane of the graphic code includes: if the angle difference is greater than or equal to the preset threshold, adjusting, according to the first tilted angle and the second tilted angle, the first tilted angle of the affine plane of the graphic code.

The embodiments of the present specification further provide one or more non-transitory computer-readable storage media configured with instructions executable by one or more processors to cause the one or more processors to perform operations including: determining a first tilted angle of an affine plane of the graphic code displayed by a graphic code display device relative to a horizontal plane; obtaining a prestored second tilted angle of a scanning window plane of a scanning device relative to the horizontal plane, wherein the graphic code is displayed for the scanning device to scan; and adjusting, according to the first tilted angle and the second tilted angle, the first tilted angle of the affine plane of the graphic code to reduce an angle between the affine plane of the graphic code and the scanning window plane of the scanning device. Adjusting the first tilted angle of the affine plane of the graphic code stretches the graphic code.

According to the technical solutions provided in the embodiments herein, when a code is scanned by a scanning device, a first tilted angle of an affine plane of a graphic code currently displayed by a graphic code display device relative to a horizontal plane is determined; a prestored second tilted angle of a scanning window plane of a scanning device relative to the horizontal plane is obtained; and an angle of the affine plane of the graphic code is adjusted according to the first tilted angle and the second tilted angle to reduce an angle between the affine plane of the graphic code and the scanning window plane. In this way, after the scanning device scans the graphic code, the graphic code can be recognized without greatly adjusting the angle of the graphic code, thereby reducing requirements imposed on the scanning device, improving the scanning success rate of the scanning device and reducing the scanning time consumed by the scanning device, and improving user experience.

BRIEF DESCRIPTION OF THE DRAWINGS

To describe the technical solutions in the embodiments of the present specification or in the prior art more clearly, the following briefly introduces the accompanying drawings required for describing the embodiments or the prior art. Apparently, the accompanying drawings in the following description show merely some embodiments in the present specification, and a person of ordinary skill in the art may still derive other drawings from these accompanying drawings without creative efforts.

DETAILED DESCRIPTION OF THE EMBODIMENTS

To enable a person skilled in the art to better understand the technical solutions in the present specification, the technical solutions of the embodiments of the present specification will be described clearly and thoroughly below with reference to the accompanying drawings of the embodiments of the present specification. Apparently, the described embodiments are merely some rather than all of the embodiments of the present specification. All other embodiments obtained by a person of ordinary skill in the art based on the embodiments of the present specification without creative efforts shall fall within the protection scope of the present specification.

The idea of the embodiments of the present specification is that when a graphic code display device is used to display a graphic code, an affine plane of the graphic code is adjusted according to a first tilted angle of the affine plane of the graphic code relative to a horizontal plane and a second tilted angle of a scanning window plane of a scanning device relative to the horizontal plane, so as to reduce an angle between the affine plane of the graphic code displayed on the graphic code display device and the scanning window plane, and to visually minimize the angle between the affine plane of the graphic code and the scanning window plane. In this way, after the scanning device scans a code, the code can be recognized without greatly adjusting the angle of the scanned graphic code, thereby reducing requirements imposed on the scanning device, improving the success rate of some old scanning devices in scanning codes, reducing the scanning time consumed by the scanning device, and improving user experience. Based on this, the embodiments of the present specification provide a graphic code display method, apparatus and device, and a storage medium, which will be described in detail below.

It should be noted that specification scenarios of the methods provided in the embodiments of the present specification may be some scanning devices placed in fixed positions or at fixed angles, such as school canteens, library access control, and community access control, that is, the scenarios in which the adjustment of the scanning angle of the scanning device is inconvenient or unallowed.

The method provided in the embodiments of the present specification may be applied to a graphic code display device. The graphic code display device may be a mobile phone, a tablet, or the like. That is, the method is performed by a graphic code display device. Specifically, the method is performed by a graphic code display apparatus installed on a graphic code display device.

Figure 1:
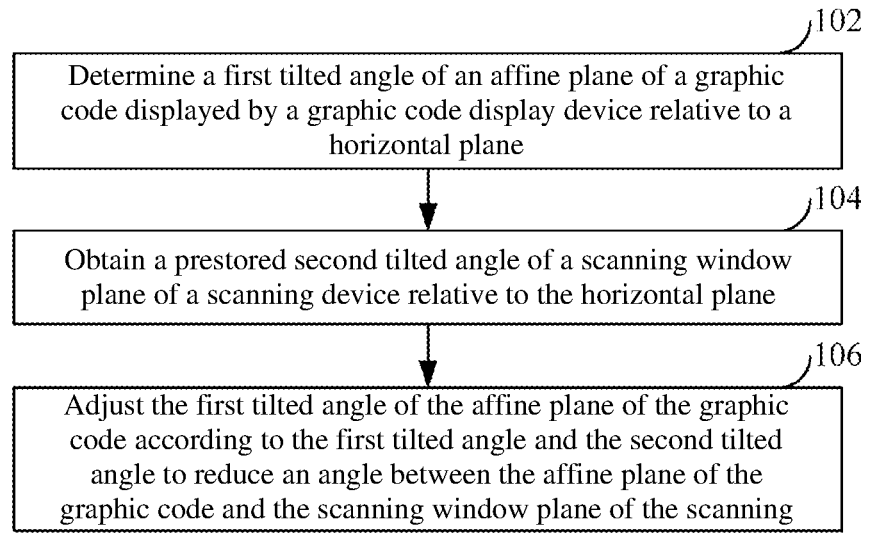
FIG. 1 is a flowchart of a graphic code display method, according to an embodiment of the present specification.

FIG. 1 is a first method flowchart of a graphic code display method, according to an embodiment of the present specification. The method shown in FIG. 1 includes at least the following steps.

In step 102, the method includes determining a first tilted angle of an affine plane of a graphic code currently displayed by a graphic code display device relative to a horizontal plane.

Figure 2:
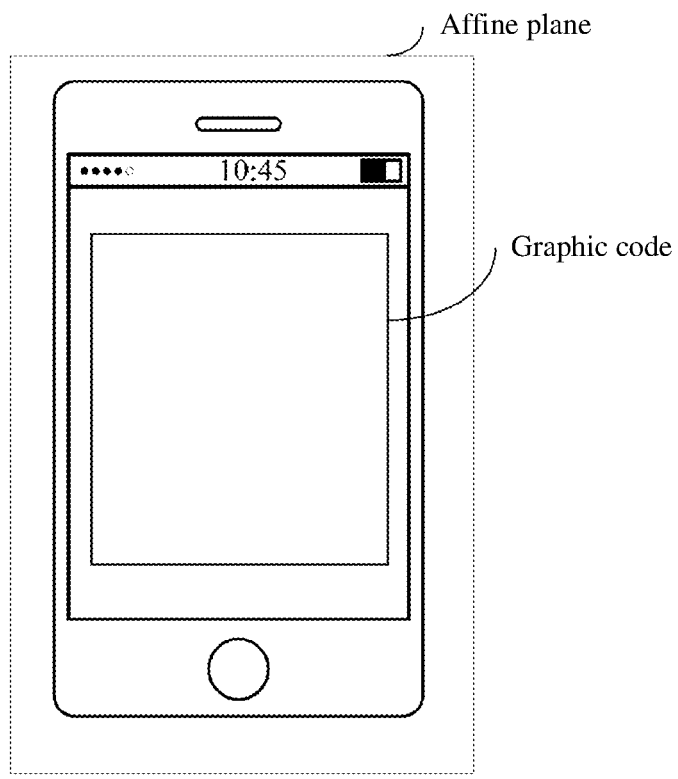
FIG. 2 is a schematic diagram of an affine plane of a graphic code in a graphic code display method, according to an embodiment of the present specification.

Generally, in an initial state, when a graphic code is displayed by a graphic code display device, the affine plane of the graphic code displayed on the graphic code display device is parallel to a screen of the graphic code display device. That is, in the case shown in step 102, the affine plane of the graphic code is a plane parallel to the screen of the graphic code display device, as shown in FIG. 2. In this case, it may be directly determined that the tilted angle of the screen of the graphic code display device relative to a horizontal plane is the first tilted angle.

It should be noted that, in an embodiment of the present specification, the tilted angle of the screen of the graphic code display device may be detected by a gyroscope on the graphic code display device, and the tilted angle is used as the first tilted angle of the affine plane of the graphic code relative to the horizontal plane.

The graphic code mentioned in the embodiment of the present specification may be a quick response code, a bar code, or the like. The commonly seen form of a quick response code is a square quick response code, a circular quick response code, or the like. In addition, the graphic code also includes other codes for displaying and scanning, details of which are omitted herein.

In step 104, the method includes obtaining a prestored second tilted angle of a scanning window plane of a scanning device relative to the horizontal plane.

Figure 3:
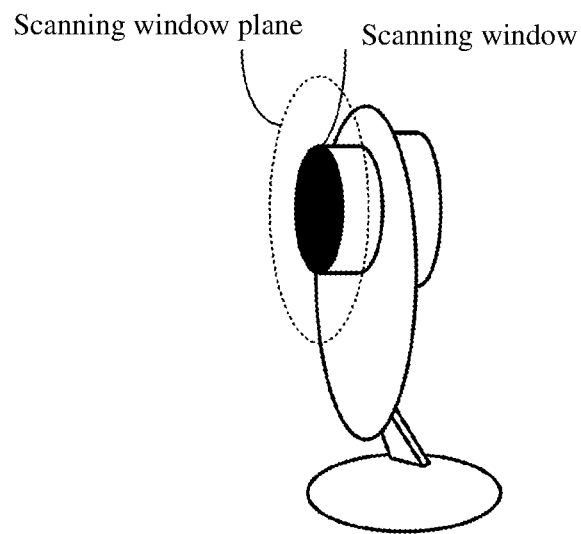
FIG. 3 is a schematic diagram of a scanning window plane in a graphic code display method, according to an embodiment of the present specification.

The scanning window plane means a plane parallel to a scanning window. For example, in the scanning device shown in FIG. 3, the scanning window plane of the scanning device is indicated by a dashed line.

For the graphic code display device, the gyroscope installed on the graphic code display device cannot detect a second tilted angle of the scanning window plane of the scanning device relative to the horizontal plane. Therefore, in the embodiment of the present specification, a second tilted angle of a scanning window plane of one or more scanning devices relative to the horizontal plane may be pre-measured. A mapping relationship between the pre-measured second tilted angle of the scanning window plane relative to the horizontal plane and an identifier of the scanning device may be stored in the graphic code display device. In specific implementation, the pre-measured second tilted angle of the scanning window plane relative to the horizontal plane may be written into an executable program of the graphic code display method. In this way, the second tilted angle of the scanning window plane of a currently used scanning device relative to the horizontal plane can be obtained directly from the graphic code display device.

Certainly, in specific implementations, for one graphic code display device, the second tilted angle of the scanning window plane of only one scanning device relative to the horizontal plane may be stored. In this way, the graphic code can be adjusted only when this scanning device is used. Certainly, second tilted angles of scanning window planes of multiple scanning devices relative to the horizontal plane may be stored in the graphic code display device. In this way, when a different scanning device is in use, a second tilted angle corresponding to the scanning window plane of this scanning device can be selected so that the graphic code can be adjusted when any of the multiple scanning devices is in use.

In step 106, the method includes adjusting an angle of the affine plane of the graphic code according to the first tilted angle and the second tilted angle to reduce an angle between the affine plane of the graphic code and the scanning window plane of the scanning device.

In the embodiment of the present specification, when the angle of the affine plane of the graphic code is adjusted according to the first tilted angle and the second tilted angle, the affine plane may be rotated. This is actually implemented by stretching the graphic code in a specific direction to visually generate a rotation angle between the affine plane of the graphic code and the screen, thereby reducing the angle between the affine plane and the scanning window plane.

In specific implementations, if the graphic code is stretched to a large extent, sharpness of the stretched graphic code may be lower, which may affect recognition of the graphic code by the scanning device. Therefore, in the embodiment of the present specification, the angle between the adjusted affine plane of the graphic code and the screen of the graphic code display device is 0 degree to N degrees, where N is less than 90. Certainly, in actual application, the specific value of N may be determined depending on stretch status of the graphic code. For example, N may be 40, or the like. The embodiment of the present specification does not limit the specific value of N.

Figure 4:
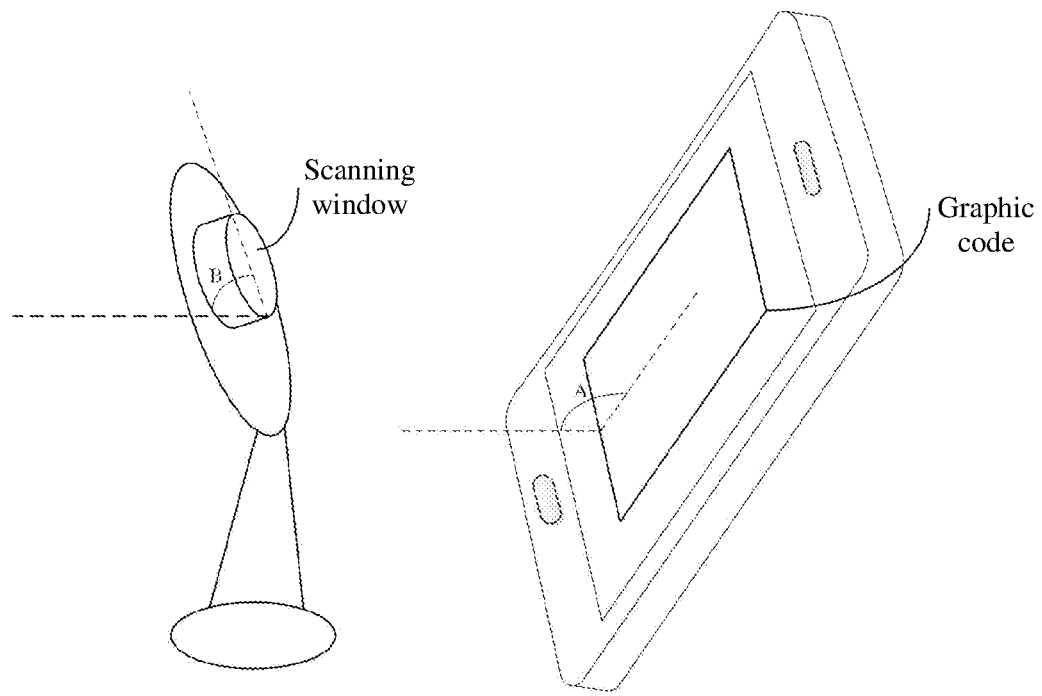
FIG. 4 is a schematic diagram illustrating a scanning device and a graphic code display device in a graphic code display method, according to an embodiment of the present specification.

For example, in a specific implementation, when a user uses a scanning port of a scanning device to scan a graphic code displayed on the graphic code display device, a schematic diagram of placement of the graphic code display device and the scanning device is shown in FIG. 4. Therefore, the first tilted angle of the affine plane of the graphic code relative to the horizontal plane is indicated by an angle A in FIG. 4, and the second tilted angle of the scanning window plane relative to the horizontal plane is indicated by an angle B in FIG. 4.

In the scenario shown in FIG. 4, there is a specific angle between the affine plane of the graphic code and the scanning window plane of the scanning device. Therefore, the affine plane of the graphic code can be rotated to minimize the angle between the affine angle and the scanning window plane.

In addition, in the embodiment of the specification, the first tilted angle and the second tilted angle may be angles relative to any plane such as a vertical plane or a tilted plane. In specific implementation, any plane may be used as a substitute, which falls within the protection scope of the Claims hereof.

The graphic code display method provided in the embodiment of the present specification can reduce the angle between the affine plane of the graphic code and the scanning window plane by adjusting the angle of the affine plane of the graphic code, thereby improving the scanning success rate of the scanning device, reducing the scanning time consumed by the scanning device, and improving user experience.

The first tilted angle may be an angle of tilting the affine plane clockwise relative to the horizontal plane, and correspondingly, the second tilted angle may be an angle of tilting the scanning window plane clockwise relative to the horizontal plane.

Correspondingly, in step 106, the adjusting an angle of the affine plane of the graphic code according to the first tilted angle and the second tilted angle specifically includes: determining an angle difference obtained by subtracting the second tilted angle from the first tilted angle, and adjusting the angle of the affine plane of the graphic code according to the angle difference.

Alternatively, the first tilted angle may be an angle of tilting the affine plane counterclockwise relative to the horizontal plane, and the second tilted angle may be an angle of tilting the scanning window plane counterclockwise relative to the horizontal plane.

Correspondingly, in step 106, the adjusting an angle of the affine plane of the graphic code according to the first tilted angle and the second tilted angle specifically includes: determining an angle difference obtained by subtracting the second tilted angle from the first tilted angle, and adjusting the angle of the affine plane of the graphic code according to the angle difference.

For ease of understanding tilted directions of the first tilted angle and the second tilted angle, the following gives description with reference to the drawings. For example, in the scenario shown in FIG. 4, the first tilted angle (angle A) is an angle of tilting the affine plane clockwise relative to the horizontal plane, and the second tilted angle (angle B) is an angle of tilting the scanning window plane clockwise relative to the horizontal plane.

After the first tilted angle and the second tilted angle are determined, an angle difference is calculated by subtracting the second tilted angle from the first tilted angle, and the angle of the affine plane of the graphic code is adjusted based on the angle difference.

Still using the example shown in FIG. 4, as regards the example shown in FIG. 4, the first tilted angle is the angle A, and the second tilted angle is the angle B. Therefore, the angle difference may be calculated by the following formula:

$$\text{angle distance} = A - B$$

Figure 5:
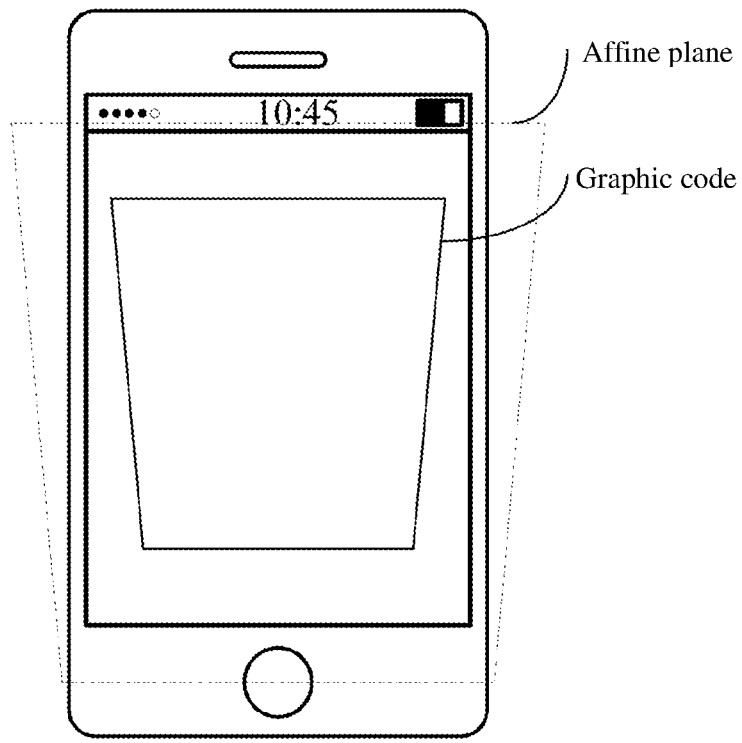
FIG. 5 is a schematic diagram of an affine plane of a graphic code in a graphic code display method, according to an embodiment of the present specification.

It should be noted that, in the embodiment of the present specification, after the angle of the affine plane of the graphic code is adjusted according to the angle difference, the affine plane of the graphic code is no longer parallel to the screen of the graphic code display device, but forms an angle relative to the screen of the graphic code display device. A possible scenario is shown in FIG. 5. In the scenario shown in FIG. 5, the adjusted affine plane of the graphic code is a plane corresponding to the dashed line in the drawing.

Ideally, the angle of the affine plane of the graphic code may be adjusted by the angle difference to make the adjusted affine plane of the graphic code be parallel to the scanning window plane. In this case, the angle of scanning the graphic code by the scanning window of the scanning device is the best, and therefore, the graphic code can be recognized quickly and accurately.

Figure 6:
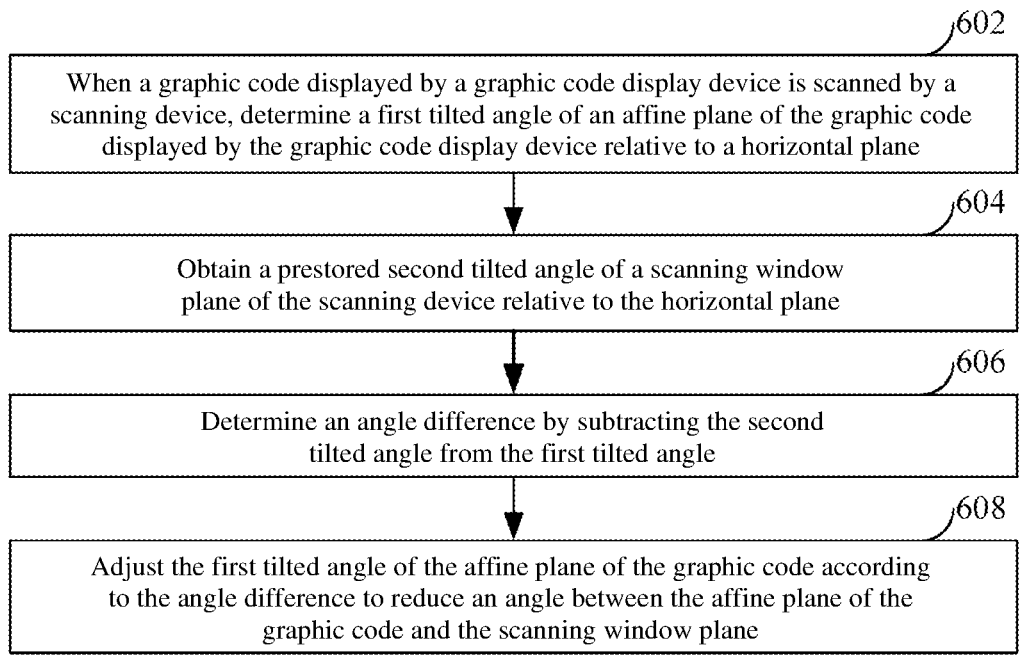
FIG. 6 is a flowchart of another graphic code display method, according to an embodiment of the present specification.
Figure 7A:
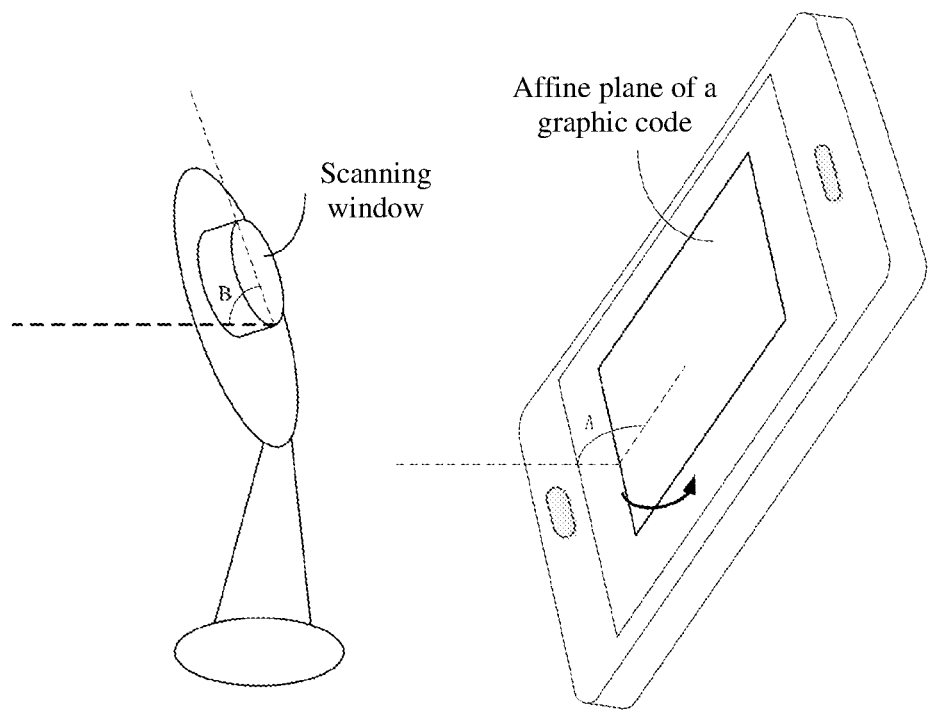
FIG. 7(a) is a schematic diagram of adjusting an affine plane of a graphic code in a graphic code display method, according to an embodiment of the present specification.
Figure 7B:
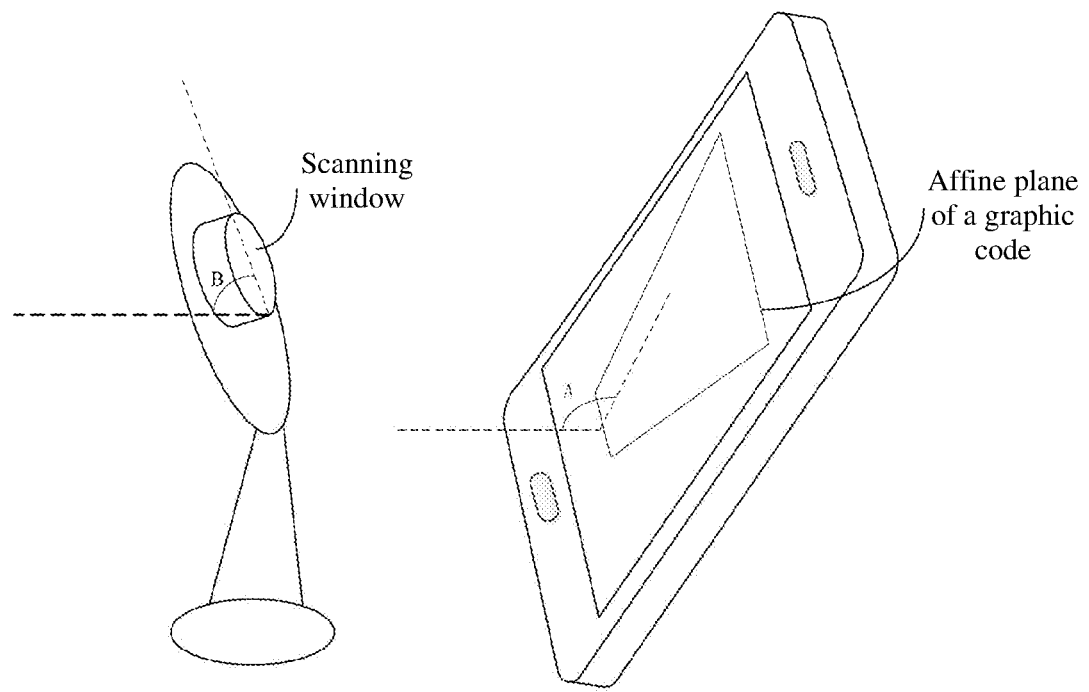
FIG. 7(b) is a schematic diagram of scanning a code after adjusting an affine plane of a graphic code in a graphic code display method, according to an embodiment of the present specification.
Figure 7C:
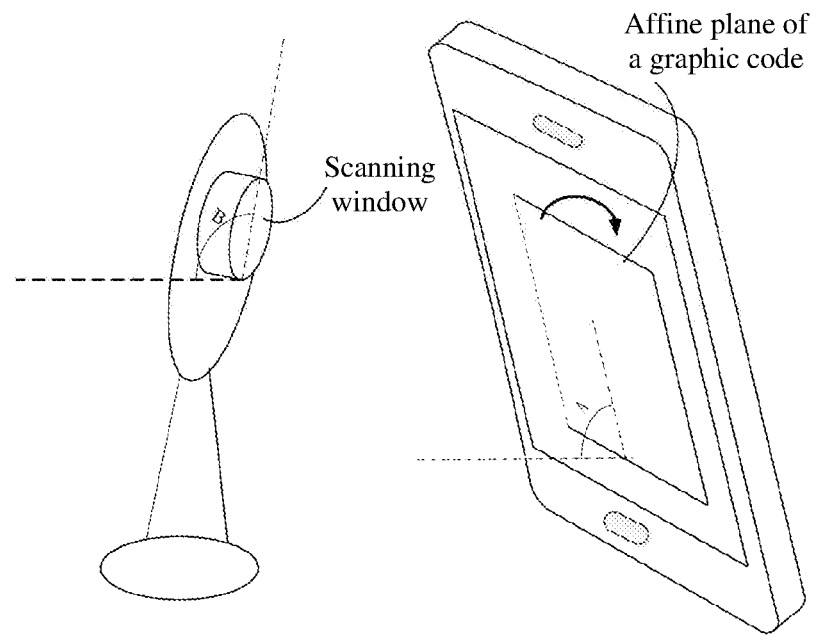
FIG. 7(c) is a schematic diagram of adjusting an affine plane of a graphic code in a graphic code display method, according to an embodiment of the present specification.
Figure 7D:
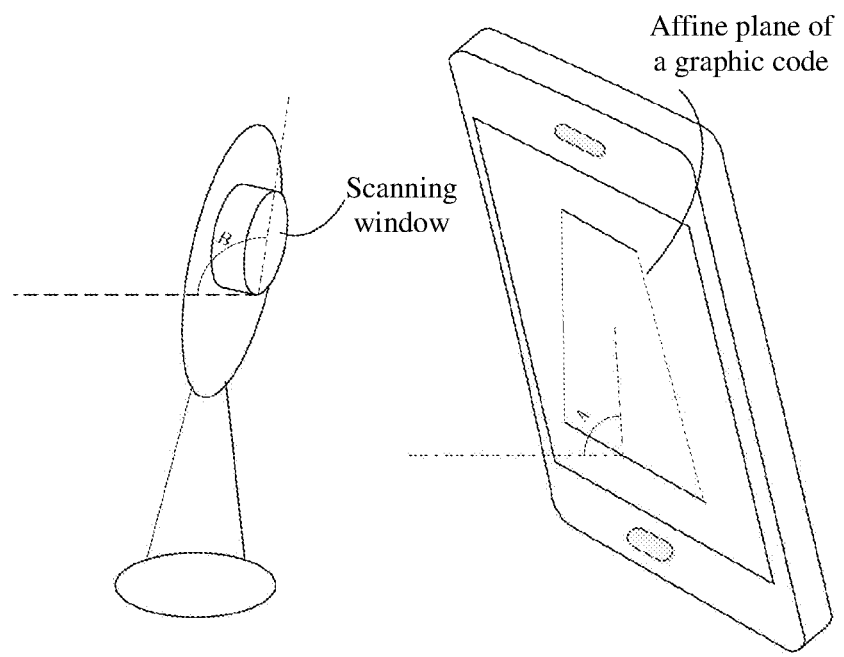
FIG. 7(d) is a schematic diagram of scanning a code after adjusting an affine plane of a graphic code in a graphic code display method, according to an embodiment of the present specification.

FIG. 6 is a second method flowchart of a graphic code display method, according to an embodiment of the present specification. The method shown in FIG. 6 includes at least the following steps.

In step 602, when a graphic code displayed by a graphic code display device is scanned by a scanning device, the method includes determining a first tilted angle of an affine plane of the graphic code displayed by the graphic code display device relative to a horizontal plane.

In step 604, the method includes obtaining a prestored second tilted angle of a scanning window plane of the scanning device relative to the horizontal plane.

The first tilted angle is an angle of tilting the affine plane clockwise relative to the horizontal plane, and the second tilted angle is an angle of tilting the scanning window plane clockwise relative to the horizontal plane; or, the first tilted angle is an angle of tilting the affine plane counterclockwise relative to the horizontal plane, and the second tilted angle is an angle of tilting the scanning window plane counterclockwise relative to the horizontal plane.

In step 606, the method includes determining an angle difference obtained by subtracting the second tilted angle from the first tilted angle.

In step 608, the method includes adjusting an angle of the affine plane of the graphic code according to the angle difference to reduce an angle between the affine plane of the graphic code and the scanning window plane.

Specifically, in the case that the first tilted angle is an angle of tilting the affine plane clockwise relative to the horizontal plane and that the second tilted angle is an angle of tilting the scanning window plane clockwise relative to the horizontal plane, the adjusting the angle of the affine plane of the graphic code according to the angle difference specifically includes: rotating, if the angle difference is a positive value, the affine plane of the graphic code to reduce the angle of tilting the affine plane clockwise relative to the horizontal plane; or, if the angle difference is a negative value, rotating the affine plane of the graphic code to increase the angle of tilting the affine plane clockwise relative to the horizontal plane.

In the case that the first tilted angle is an angle of tilting the affine plane counterclockwise relative to the horizontal plane and that the second tilted angle is an angle of tilting the scanning window plane counterclockwise relative to the horizontal plane, the adjusting the angle of the affine plane of the graphic code according to the angle difference specifically includes: rotating, if the angle difference is a positive value, the affine plane of the graphic code to reduce the angle of tilting the affine plane counterclockwise relative to the horizontal plane; or, if the angle difference is a negative value, rotating the affine plane of the graphic code to increase the angle of tilting the affine plane counterclockwise relative to the horizontal plane.

For ease of understanding, using an example in which the first tilted angle is an angle of tilting the affine plane clockwise relative to the horizontal plane and the second tilted angle is an angle of tilting the scanning window plane clockwise relative to the horizontal plane, the following describes a process of adjusting the affine plane with reference to drawings.

In specific implementations, if the angle difference is a positive value, it indicates that the tilted angle of the affine plane of the graphic code relative to the horizontal plane is greater than the tilted angle of the scanning window plane relative to the horizontal plane. In this case, to reduce the angle between the affine plane of the graphic code and the scanning window plane, it is necessary to reduce the angle of tilting the affine plane clockwise relative to the horizontal plane. In rotating the affine plane of the graphic code, the affine plane of the graphic code may be rotated counterclockwise, as shown in FIG. 7 (a), and may be rotated by a rotation angle less than or equal to the angle difference. In this way, after the affine plane of the graphic code is rotated, the angle of tilting the affine plane of the graphic code clockwise is reduced, thereby reducing the angle between the affine plane of the graphic code and the scanning window plane. The rotated graphic code is shown in FIG. 7 (b).

If the angle difference is a negative value, it indicates that the tilted angle of the affine plane of the graphic code relative to the horizontal plane is less than the tilted angle of the scanning window plane relative to the horizontal plane. In this case, to reduce the angle between the affine plane of the graphic code and the scanning window plane, it is necessary to increase the angle of tilting the affine plane clockwise relative to the horizontal plane. In rotating the affine plane of the graphic code, the affine plane of the graphic code may be rotated clockwise, as shown in FIG. 7 (c), and may be rotated by a rotation angle less than or equal to the angle difference. In this way, after the affine plane of the graphic code is rotated, the angle of tilting the affine plane of the graphic code clockwise is increased, thereby reducing the angle between the affine plane of the graphic code and the scanning window plane. The rotated graphic code is shown in FIG. 7 (d).

Preferably, the size of the rotation angle may be the determined angle difference between the first tilted angle and the second tilted angle. In this way, the adjusted affine plane of the graphic code is parallel to the scanning window plane. Specifically, in a specific implementation, in the case that the first tilted angle is an angle of tilting the affine plane clockwise relative to the horizontal plane and that the second tilted angle is an angle of tilting the scanning window plane clockwise relative to the horizontal plane, the adjusting the angle of the affine plane of the graphic code according to the angle difference specifically includes: rotating, if the angle difference is a positive value, the affine plane of the graphic code counterclockwise by the angle difference; or, if the angle difference is a negative value, rotating the affine plane of the graphic code clockwise by the angle difference.

In the case that the first tilted angle is an angle of tilting the affine plane counterclockwise relative to the horizontal plane and that the second tilted angle is an angle of tilting the scanning window plane counterclockwise relative to the horizontal plane, the adjusting the angle of the affine plane of the graphic code according to the angle difference specifically includes: rotating, if the angle difference is a positive value, the affine plane of the graphic code clockwise by the angle difference; or, if the angle difference is a negative value, rotating the affine plane of the graphic code counterclockwise by the angle difference.

In the embodiment of the specification, when the affine plane of the graphic code is rotated, the rotation angle of the affine plane is the angle difference. In this way, the rotated affine plane of the graphic code is parallel to the scanning window plane, thereby ensuring the best angle of scanning the graphic code by the scanning window of the graphic code and recognizing the graphic code quickly and accurately.

In specific implementations, the operations in step 102 may be started in the following two scenarios:

1) After it is detected that the graphic code appears and that the graphic code display device is flipped over and stays for a preset time interval, performing an operation of determining the first tilted angle; and 2) Once it is detected that the graphic code display device is moved after the graphic code appears, performing an operation of determining the first tilted angle.

In the scenario 1) above, generally, when a user needs to use a graphic code, the user first shows up the graphic code on the graphic code display device. In this case, the screen of the graphic code display device faces the user. When a scanning device scans the graphic code, the user needs to flip over the graphic code display device so that the screen of the graphic code display device for displaying the graphic code faces the scanning device. That is, when the scanning device scans a code, the graphic code display device flips over for a time. Therefore, after it is detected that the graphic code display device is flipped over and stays for a preset time interval after the graphic code appears, the operation of determining the first tilted angle in step 102 may be started.

After flipping over the graphic code display device, the user may need to adjust the position of the graphic code display device, and it takes a time interval before the graphic code displayed by the graphic code display device is presented to the scanning device. To improve accuracy of scanning, the method provided in the embodiment of the present specification is performed only after the graphic code display device is steady. Therefore, step 102 is performed only after a preset time interval has elapsed after the flip is detected. The time interval may be set according to an actual application scenario. For example, the preset time interval may be 3 seconds, 5 seconds, or the like. The embodiments of the present specification do not limit the specific time interval.

Certainly, in a specific implementation, the implementation shown in the scenario 2) may be applied in addition to the implementation shown in the scenario 1).

Generally, when the user needs to scan a graphic code, after the graphic code appears on the graphic code display device, the graphic code display device needs to be constantly moved before the graphic code is scanned so that the graphic code displayed by the graphic code display device can be placed within a scanning range of the scanning window of the scanning device. Therefore, once it is detected that the graphic code display device is moved, step 102 may be performed until the graphic code display device ceases moving.

In addition, it should be noted that, in the embodiment of the present specification, the movement or flip or the like of the graphic code display device may be detected by a gyroscope installed on the graphic code display device.

In the embodiment of the specification, if second tilted angles of scanning window planes of multiple scanning devices relative to the horizontal plane are prestored, then in step 104, the obtaining the prestored second tilted angle of the scanning window plane of the scanning device relative to the horizontal plane specifically includes the following process: determining identification information of a currently used scanning device; and determining, based on the identification information of the currently used scanning device, a second tilted angle of a scanning window plane of the currently used scanning device relative to the horizontal plane among prestored second tilted angles of the scanning window planes of all the scanning devices relative to the horizontal plane.

That is, a mapping relationship between an identifier of each scanning device and a corresponding second tilted angle is stored in the graphic code display device.

Specifically, the determining the identification information of the currently used scanning device includes at least the following two scenarios: determining a scanning device nearest to a current geographical location, using the nearest scanning device as a currently used scanning device, and obtaining identification information of the currently used scanning device; or communicating, by using a Bluetooth module or a wireless fidelity (WiFi) module of the graphic code display device, with a network device connected to the scanning device to obtain the identification information of the currently used scanning device from the network device.

In specific implementations, after it is detected that the user shows up the graphic code on the graphic code display device, scanning devices near the current geographical location that are detected by the graphic code display device may be obtained from the graphic code display device, and a scanning device nearest to the current geographic location is used as the scanning device currently used by the user. Based on the identification information of this scanning device, the second tilted angle corresponding to the scanning window plane of this scanning device is determined among prestored second tilted angles of the scanning window planes of all the scanning devices.

Specifically, the identification information of the scanning device may be geographic location information corresponding to the scanning device, or the name, model or the like of the scanning device, as long as the identification information is sufficient for distinguishing between the scanning devices disposed in different locations. The embodiments of the present specification do not limit the specific content of the identifier of the scanning device.

In another specific implementation, generally, each scanning device is connected to a network device (such as a router). The network device stores identification information of the graphic code display device, such as the model or the geographic location or the like of the graphic code display device. Therefore, the identification information of the currently used scanning device can be obtained by connecting to the router through a Bluetooth module or a WiFi module of the graphic code display device.

Certainly, in addition, if the second tilted angles of the scanning window planes of multiple scanning devices relative to the horizontal plane are stored in the graphic code display device, the second tilted angle of the scanning window plane of the currently used scanning device relative to the horizontal plane may be determined by attempting the second tilted angles one by one. For example, the graphic code display device stores a second tilted angle corresponding to a scanning window of a scanning device 1, a second tilted angle corresponding to a scanning window of a scanning device 2, and a second tilted angle corresponding to a scanning window of a scanning device 3. Therefore, the affine plane of the graphic code may be adjusted first based on the first tilted angle corresponding to the scanning window of the scanning device 1. If the scanning succeeds within a specific time interval, the process ends. If the scanning fails within a specific time interval, the adjustment continues to be performed by using the second tilted angle corresponding to the scanning window of the scanning device 2 until the scanning succeeds.

In specific implementations, when the user scans a graphic code on a graphic code display device placed in an initial location by the user, the affine plane of the graphic code is parallel to or forms a very small angle relative to the scanning window plane. In this case, the scanning device may recognize the scanned graphic code without being affected. That is, no great impact is caused to the scanning success rate or scanning time of the scanning device. Therefore, in this case, in order to reduce the time and resource consumption caused by the adjustment of the affine plane, the adjustment of the angle of the affine plane of the graphic code may be skipped. Therefore, in the embodiments of the present specification, a threshold may be preset according to an actual application scenario. If an angle difference between the first tilted angle and the second tilted angle is less than or equal to the preset threshold, the operation of adjusting the angle of the affine plane of the graphic code may be skipped.

In specific implementations, before step 106, the following step may be performed: determining whether the angle difference is greater than or equal to a preset threshold; and correspondingly, step 106 includes: adjusting, if the angle difference is greater than or equal to the preset threshold, the angle of the affine plane of the graphic code according to the first tilted angle and the second tilted angle.

When the angle difference is greater than or equal to the preset threshold, it is considered that scanning the graphic code in this case will affect the scanning device in recognizing the scanned graphic code. For example, the recognition will fail or take a long time, which will affect user experience. In this case, in order to reduce occurrence of such consequences, the angle of the affine plane of the graphic code needs to be adjusted to visually generate an angle between the affine plane of the graphic code and the screen of the graphic code display device, thereby reducing the angle between the affine plane of the graphic code and the scanning window plane.

Figure 8:
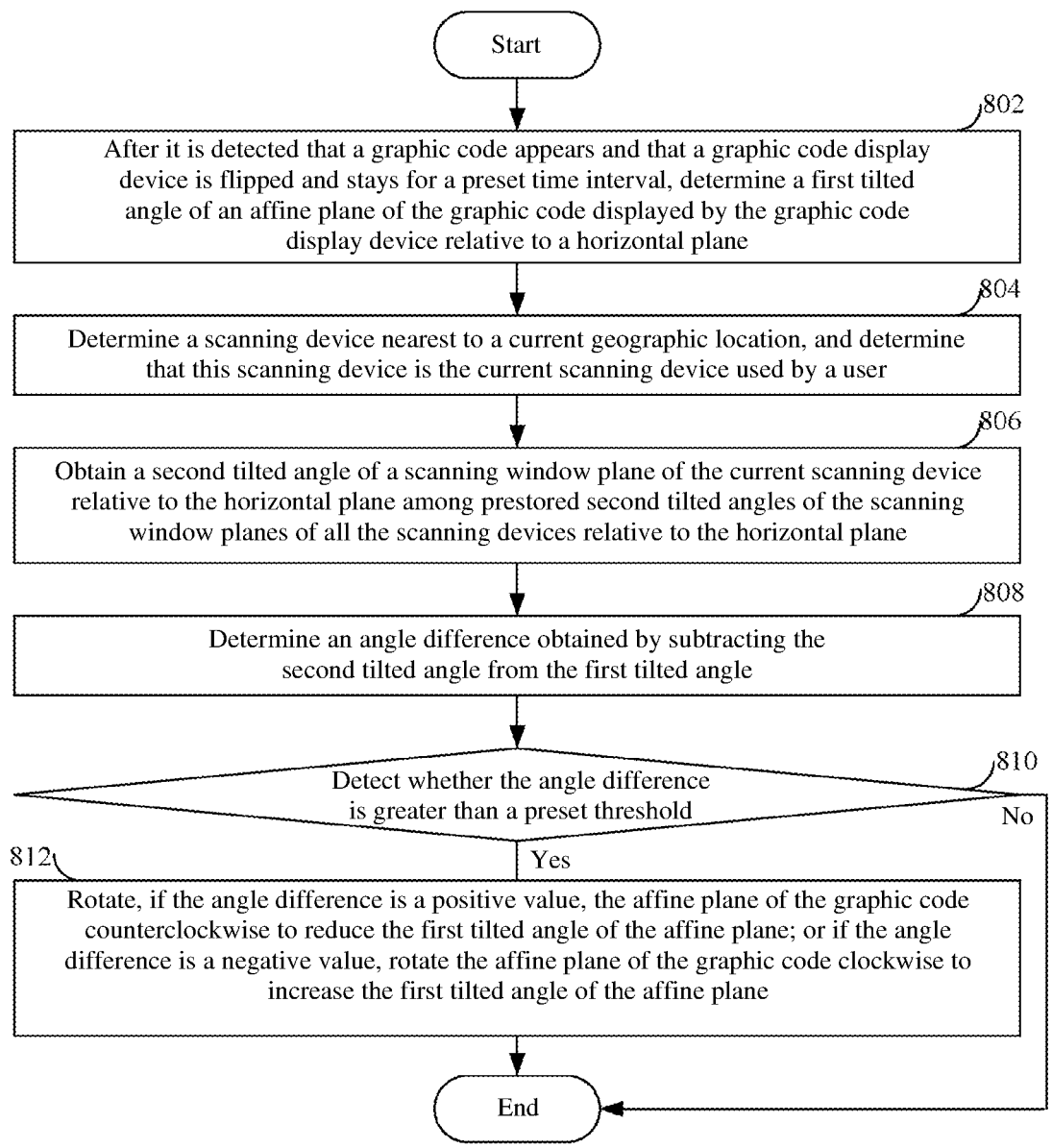
FIG. 8 is a flowchart of a graphic code display method, according to an embodiment of the present specification.

FIG. 8 is a third method flowchart of a graphic code display method, according to an embodiment of the present specification. In the scenario shown in FIG. 8, the first tilted angle is an angle of tilting the affine plane counterclockwise relative to the horizontal plane, and the second tilted angle is an angle of tilting the scanning window plane counterclockwise relative to the horizontal plane. The method shown in FIG. 8 includes at least the following steps.

In step 802, after it is detected that a graphic code appears and that a graphic code display device is flipped over and stays for a preset time interval, the method includes determining a first tilted angle of an affine plane of the graphic code displayed by the graphic code display device relative to a horizontal plane.

In step 804, the method includes determining a scanning device nearest to a current geographic location, and determining that this scanning device is the scanning device currently used by a user.

In step 806, the method includes obtaining a second tilted angle of a scanning window plane of the currently used scanning device relative to the horizontal plane among prestored second tilted angles of the scanning window planes of all the scanning devices relative to the horizontal plane.

In step 808, the method includes determining an angle difference obtained by subtracting the second tilted angle from the first tilted angle.

In step 810, the method includes detecting whether the angle difference is greater than the preset threshold; if greater, perform step 812; otherwise, end the process.

In step 812, If the angle difference is a positive value, the method includes rotating the affine plane of the graphic code to reduce the angle of tilting the affine plane counterclockwise relative to the horizontal plane. Or if the angle difference is a negative value, the method includes rotating the affine plane of the graphic code to increase the angle of tilting the affine plane counterclockwise relative to the horizontal plane.

In the graphic code display method provided in the embodiment of the present specification, when a code is scanned by a scanning device, a first tilted angle of an affine plane of a graphic code currently displayed by a graphic code display device relative to a horizontal plane is determined; a prestored second tilted angle of a scanning window plane of a scanning device relative to the horizontal plane is obtained; and an angle of the affine plane of the graphic code is adjusted according to the first tilted angle and the second tilted angle to reduce an angle between the affine plane of the graphic code and the scanning window plane. In this way, after the scanning device scans the graphic code, the graphic code can be recognized without greatly adjusting the angle of the graphic code, thereby reducing requirements imposed on the scanning device, improving the scanning success rate of the scanning device and reducing the scanning time consumed by the scanning device, and improving user experience.

Figure 9:
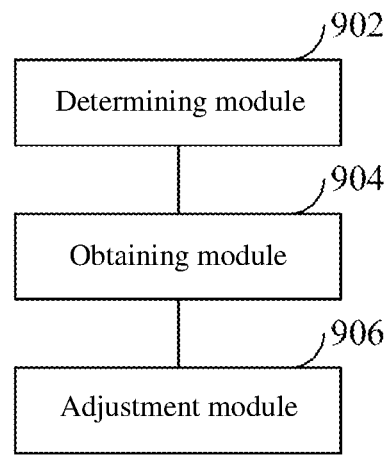
FIG. 9 is a block diagram illustrating modules of a graphic code display apparatus, according to an embodiment of the present specification.

Corresponding to the graphic code display method provided in the embodiments of the specification, based on the same idea, the embodiments of the present specification further provide a graphic code display apparatus for performing the graphic code display method provided in the embodiments of the present specification. FIG. 9 is a block diagram of modules of a graphic code display apparatus, according to an embodiment of the present specification. The apparatus shown in FIG. 9 includes: a determining module 902, an obtaining module 904, and an adjustment module 906.

The determining module 902 is configured to determine a first tilted angle of an affine plane of a graphic code currently displayed by a graphic code display device relative to a horizontal plane.

The obtaining module 904 is configured to obtain a prestored second tilted angle of a scanning window plane of a scanning device relative to the horizontal plane.

The adjustment module 906 is configured to adjust an angle of the affine plane of the graphic code according to the first tilted angle and the second tilted angle to reduce an angle between the affine plane of the graphic code and the scanning window plane of the scanning device.

In some embodiments, the first tilted angle is an angle of tilting the affine plane clockwise relative to the horizontal plane, and the second tilted angle is an angle of tilting the scanning window plane clockwise relative to the horizontal plane.

Correspondingly, the adjustment module 906 includes: a first determining unit and a first adjustment unit.

The first determining unit is configured to determine an angle difference obtained by subtracting the second tilted angle from the first tilted angle.

The first adjustment unit is configured to adjust the angle of the affine plane of the graphic code according to the angle difference.

Alternatively, the first tilted angle is an angle of tilting the affine plane counterclockwise relative to the horizontal plane, and the second tilted angle is an angle of tilting the scanning window plane counterclockwise relative to the horizontal plane.

Correspondingly, the adjustment module 906 includes: a second determining unit, and a second adjustment unit.

The second determining unit is configured to determine an angle difference obtained by subtracting the second tilted angle from the first tilted angle; and The second adjustment unit is configured to adjust the angle of the affine plane of the graphic code according to the angle difference.

In some embodiments, the first tilted angle is an angle of tilting the affine plane clockwise relative to the horizontal plane, and the second tilted angle is an angle of tilting the scanning window plane clockwise relative to the horizontal plane.

The first adjustment unit includes: a first rotation subunit, configured to rotate, if the angle difference is a positive value, the affine plane of the graphic code to reduce the angle of tilting the affine plane clockwise relative to the horizontal plane; or, if the angle difference is a negative value, rotate the affine plane of the graphic code to increase the angle of tilting the affine plane clockwise relative to the horizontal plane.

The first tilted angle is an angle of tilting the affine plane counterclockwise relative to the horizontal plane, and the second tilted angle is an angle of tilting the scanning window plane counterclockwise relative to the horizontal plane.

The second adjustment unit includes: a second rotation subunit, configured to rotate, if the angle difference is a positive value, the affine plane of the graphic code to reduce the angle of tilting the affine plane counterclockwise relative to the horizontal plane; or, if the angle difference is a negative value, rotate the affine plane of the graphic code to increase the angle of tilting the affine plane counterclockwise relative to the horizontal plane.

In some embodiments, the first tilted angle is an angle of tilting the affine plane clockwise relative to the horizontal plane, and the second tilted angle is an angle of tilting the scanning window plane clockwise relative to the horizontal plane.

Correspondingly, the first adjustment unit further includes: a third rotation subunit, configured to rotate, if the angle difference is a positive value, the affine plane of the graphic code counterclockwise by the angle difference; or, if the angle difference is a negative value, rotate the affine plane of the graphic code clockwise by the angle difference. The first tilted angle is an angle of tilting the affine plane counterclockwise relative to the horizontal plane, and the second tilted angle is an angle of tilting the scanning window plane counterclockwise relative to the horizontal plane.

Correspondingly, the second adjustment unit further includes: a fourth rotation subunit, configured to rotate, if the angle difference is a positive value, the affine plane of the graphic code clockwise by the angle difference; or, if the angle difference is a negative value, rotate the affine plane of the graphic code counterclockwise by the angle difference.

In some embodiments, the apparatus provided in the embodiment of the present specification further includes: a determining module, configured to determine whether the angle difference is greater than or equal to a preset threshold.

Correspondingly, the adjustment module 906 includes: a third adjustment unit, configured to adjust, if the angle difference is greater than or equal to the preset threshold, the angle of the affine plane of the graphic code according to the first tilted angle and the second tilted angle.

In some embodiments, if second tilted angles of scanning window planes of multiple scanning devices relative to the horizontal plane are prestored, the obtaining module includes: a second determining unit, and a third determining unit.

The second determining unit is configured to determine identification information of a currently used scanning device; and The third determining unit is configured to determine, based on the identification information of the currently used scanning device, a second tilted angle of a scanning window plane of the currently used scanning device relative to the horizontal plane among prestored second tilted angles of the scanning window planes of all the scanning devices relative to the horizontal plane.

In some embodiments, the second determining unit is specifically configured to: determine a scanning device nearest to a current geographical location, use the nearest scanning device as a currently used scanning device, and obtain identification information of the currently used scanning device; or communicate, by using a Bluetooth module or a wireless fidelity (WiFi) module of the graphic code display device, with a network device connected to the scanning device to obtain the identification information of the currently used scanning device from the network device.

In some embodiments, the determining module 902 includes: a first execution unit configured to perform, after it is detected that the graphic code appears and that the graphic code display device is flipped over and stays for a preset time interval, an operation of determining the first tilted angle; or a second execution unit configured to perform, once it is detected that the graphic code display device is moved after the graphic code appears, an operation of determining the first tilted angle.

The graphic code display apparatus in the embodiment of the present specification can also perform the method performed by the graphic code display apparatus shown in FIG. 1 to FIG. 8, and implement the functions of the graphic code display apparatus in the embodiments shown in FIG. 1 to FIG. 8, details of which are omitted herein.

With the graphic code display apparatus provided in the embodiment of the present specification, when a code is scanned by a scanning device, a first tilted angle of an affine plane of a graphic code currently displayed by a graphic code display device relative to a horizontal plane is determined; a prestored second tilted angle of a scanning window plane of a scanning device relative to the horizontal plane is obtained; and an angle of the affine plane of the graphic code is adjusted according to the first tilted angle and the second tilted angle to reduce an angle between the affine plane of the graphic code and the scanning window plane. In this way, after the scanning device scans the graphic code, the graphic code can be recognized without greatly adjusting the angle of the graphic code, thereby reducing requirements imposed on the scanning device, improving the scanning success rate of the scanning device and reducing the scanning time consumed by the scanning device, and improving user experience.

Figure 10:
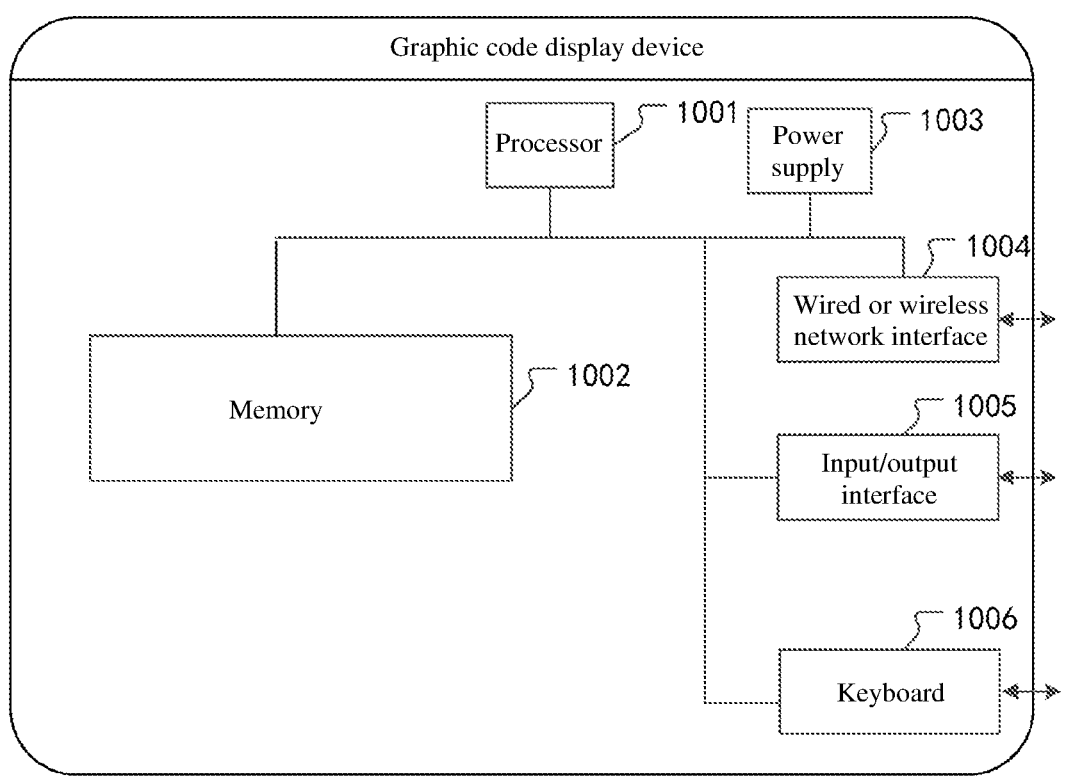
FIG. 10 is a structural diagram of a graphic code display device, according to an embodiment of the present specification.

Further, based on the methods shown in FIG. 1 to FIG. 8, an embodiment of the present specification further provides a graphic code display device, as shown in FIG. 10.

The graphic code display device may vary sharply depending on configuration or performance, and may include one or more processors 1001 and a memory 1002. The memory 1002 may store one or more applications or data. The memory 1002 may be a volatile memory or a permanent memory. The application stored in the memory 1002 may include one or more modules (not shown in the drawings), and each module may include a series of computer-executable instruction information in the graphic code display device. Furthermore, the processor 1001 may be configured to communicate with the memory 1002, and execute a series of computer-executable instruction information in the memory 1002 on the graphic code display device. The graphic code display device may further include one or more power sources 1003, one or more wired or wireless network interfaces 1004, one or more input/output interfaces 1005, one or more keyboards 1006, and the like.

In a specific embodiment, the graphic code display device includes a memory and one or more programs. The one or more programs are stored in the memory, and the one or more programs may include one or more modules. Each module may include a series of computer-executable instruction information in the graphic code display device. The one or more processors are configured to execute the one or more programs including computer-executable instructions for: determining a first tilted angle of an affine plane of a graphic code currently displayed by a graphic code display device relative to a horizontal plane; obtaining a prestored second tilted angle of a scanning window plane of a scanning device relative to the horizontal plane; and adjusting an angle of the affine plane of the graphic code according to the first tilted angle and the second tilted angle to reduce an angle between the affine plane of the graphic code and the scanning window plane of the scanning device.

In some embodiments, when the computer-executable instruction information is executed, the first tilted angle is an angle of tilting the affine plane clockwise relative to the horizontal plane, and the second tilted angle is an angle of tilting the scanning window plane clockwise relative to the horizontal plane.

The adjusting an angle of the affine plane of the graphic code according to the first tilted angle and the second tilted angle includes: determining an angle difference obtained by subtracting the second tilted angle from the first tilted angle; and adjusting the angle of the affine plane of the graphic code according to the angle difference.

Alternatively, the first tilted angle is an angle of tilting the affine plane counterclockwise relative to the horizontal plane, and the second tilted angle is an angle of tilting the scanning window plane counterclockwise relative to the horizontal plane.

The adjusting an angle of the affine plane of the graphic code according to the first tilted angle and the second tilted angle includes: determining an angle difference obtained by subtracting the second tilted angle from the first tilted angle; and adjusting the angle of the affine plane of the graphic code according to the angle difference.

In some embodiments, when the computer-executable instruction information is executed, the first tilted angle is an angle of tilting the affine plane clockwise relative to the horizontal plane, and the second tilted angle is an angle of tilting the scanning window plane clockwise relative to the horizontal plane.

The adjusting the angle of the affine plane of the graphic code according to the angle difference includes: rotating, if the angle difference is a positive value, the affine plane of the graphic code to reduce the angle of tilting the affine plane clockwise relative to the horizontal plane; or if the angle difference is a negative value, rotating the affine plane of the graphic code to increase the angle of tilting the affine plane clockwise relative to the horizontal plane.

The first tilted angle is an angle of tilting the affine plane counterclockwise relative to the horizontal plane, and the second tilted angle is an angle of tilting the scanning window plane counterclockwise relative to the horizontal plane.

The adjusting the angle of the affine plane of the graphic code according to the angle difference includes: rotating, if the angle difference is a positive value, the affine plane of the graphic code to reduce the angle of tilting the affine plane counterclockwise relative to the horizontal plane; or, if the angle difference is a negative value, rotating the affine plane of the graphic code to increase the angle of tilting the affine plane counterclockwise relative to the horizontal plane.

In some embodiments, when the computer-executable instruction information is executed, the first tilted angle is an angle of tilting the affine plane clockwise relative to the horizontal plane, and the second tilted angle is an angle of tilting the scanning window plane clockwise relative to the horizontal plane.

The adjusting the angle of the affine plane of the graphic code according to the angle difference includes: rotating, if the angle difference is a positive value, the affine plane of the graphic code counterclockwise by the angle difference; or, if the angle difference is a negative value, rotating the affine plane of the graphic code clockwise by the angle difference.

The first tilted angle is an angle of tilting the affine plane counterclockwise relative to the horizontal plane, and the second tilted angle is an angle of tilting the scanning window plane counterclockwise relative to the horizontal plane.

The adjusting the angle of the affine plane of the graphic code according to the angle difference includes: rotating, if the angle difference is a positive value, the affine plane of the graphic code clockwise by the angle difference; or, if the angle difference is a negative value, rotating the affine plane of the graphic code counterclockwise by the angle difference.

In some embodiments, when the computer-executable instruction information is executed, before the angle of the affine plane of the graphic code is adjusted according to the first tilted angle and the second tilted angle, the following step may be performed: determining whether the angle difference is greater than or equal to a preset threshold.

Correspondingly, the adjusting an angle of the affine plane of the graphic code according to the first tilted angle and the second tilted angle specifically includes: adjusting, if the angle difference is greater than or equal to the preset threshold, the angle of the affine plane of the graphic code according to the first tilted angle and the second tilted angle.

In some embodiments, when the computer-executable instruction information is executed, if second tilted angles of scanning window planes of multiple scanning devices relative to the horizontal plane are prestored, the obtaining a prestored second tilted angle of a scanning window plane of a scanning device relative to the horizontal plane includes: determining identification information of a currently used scanning device; and determining, based on the identification information of the currently used scanning device, a second tilted angle of a scanning window plane of the currently used scanning device relative to the horizontal plane among prestored second tilted angles of the scanning window planes of all the scanning devices relative to the horizontal plane.

In some embodiments, when the computer-executable instruction information is executed, the determining the identification information of the currently used scanning device includes: determining a scanning device nearest to a current geographical location, using the nearest scanning device as a currently used scanning device, and obtaining identification information of the currently used scanning device; or communicating, by using a Bluetooth module or a wireless fidelity (WiFi) module of the graphic code display device, with a network device connected to the scanning device to obtain the identification information of the currently used scanning device from the network device.

In some embodiments, when the computer-executable instruction information is executed, the determining a first tilted angle of an affine plane of a graphic code currently displayed by a graphic code display device relative to a horizontal plane includes: performing, after it is detected that the graphic code appears and that the graphic code display device is flipped over and stays for a preset time interval, an operation of determining the first tilted angle; or performing, once it is detected that the graphic code display device is moved after the graphic code appears, an operation of determining the first tilted angle.

With the graphic code display device provided in the embodiment of the present specification, when a code is scanned by a scanning device, a first tilted angle of an affine plane of a graphic code currently displayed by a graphic code display device relative to a horizontal plane is determined; a prestored second tilted angle of a scanning window plane of a scanning device relative to the horizontal plane is obtained; and an angle of the affine plane of the graphic code is adjusted according to the first tilted angle and the second tilted angle to reduce an angle between the affine plane of the graphic code and the scanning window plane. In this way, after the scanning device scans the graphic code, the graphic code can be recognized without greatly adjusting the angle of the graphic code, thereby reducing requirements imposed on the scanning device, improving the scanning success rate of the scanning device and reducing the scanning time consumed by the scanning device, and improving user experience.

Further, based on the methods shown in FIG. 1 to FIG. 8, an embodiment of the present specification further provides a storage medium, configured to store computer-executable instructions. In a specific embodiment, the storage medium may be a USB disk, an optical disk, a hard disk, or the like. When executed by a processor, the computer-executable instructions stored in the storage medium can implement the following process: determining a first tilted angle of an affine plane of a graphic code currently displayed by a graphic code display device relative to a horizontal plane; obtaining a prestored second tilted angle of a scanning window plane of a scanning device relative to the horizontal plane; and adjusting an angle of the affine plane of the graphic code according to the first tilted angle and the second tilted angle to reduce an angle between the affine plane of the graphic code and the scanning window plane of the scanning device.

In some embodiments, when the computer-executable instruction information stored in the storage medium is executed by a processor, the first tilted angle is an angle of tilting the affine plane clockwise relative to the horizontal plane, and the second tilted angle is an angle of tilting the scanning window plane clockwise relative to the horizontal plane.

The adjusting an angle of the affine plane of the graphic code according to the first tilted angle and the second tilted angle includes: determining an angle difference obtained by subtracting the second tilted angle from the first tilted angle; and adjusting the angle of the affine plane of the graphic code according to the angle difference.

Alternatively, the first tilted angle is an angle of tilting the affine plane counterclockwise relative to the horizontal plane, and the second tilted angle is an angle of tilting the scanning window plane counterclockwise relative to the horizontal plane.

The adjusting an angle of the affine plane of the graphic code according to the first tilted angle and the second tilted angle includes: determining an angle difference obtained by subtracting the second tilted angle from the first tilted angle; and adjusting the angle of the affine plane of the graphic code according to the angle difference.

In some embodiments, when the computer-executable instruction information stored in the storage medium is executed by a processor, the first tilted angle is an angle of tilting the affine plane clockwise relative to the horizontal plane, and the second tilted angle is an angle of tilting the scanning window plane clockwise relative to the horizontal plane.

The adjusting the angle of the affine plane of the graphic code according to the angle difference includes: rotating, if the angle difference is a positive value, the affine plane of the graphic code to reduce the angle of tilting the affine plane clockwise relative to the horizontal plane; or, if the angle difference is a negative value, rotating the affine plane of the graphic code to increase the angle of tilting the affine plane clockwise relative to the horizontal plane.

The first tilted angle is an angle of tilting the affine plane counterclockwise relative to the horizontal plane, and the second tilted angle is an angle of tilting the scanning window plane counterclockwise relative to the horizontal plane.

The adjusting the angle of the affine plane of the graphic code according to the angle difference includes: rotating, if the angle difference is a positive value, the affine plane of the graphic code to reduce the angle of tilting the affine plane counterclockwise relative to the horizontal plane; or, if the angle difference is a negative value, rotating the affine plane of the graphic code to increase the angle of tilting the affine plane counterclockwise relative to the horizontal plane.

In some embodiments, when the computer-executable instruction information stored in the storage medium is executed by a processor, the first tilted angle is an angle of tilting the affine plane clockwise relative to the horizontal plane, and the second tilted angle is an angle of tilting the scanning window plane clockwise relative to the horizontal plane.

The adjusting the angle of the affine plane of the graphic code according to the angle difference includes: rotating, if the angle difference is a positive value, the affine plane of the graphic code counterclockwise by the angle difference; or, if the angle difference is a negative value, rotating the affine plane of the graphic code clockwise by the angle difference.

The first tilted angle is an angle of tilting the affine plane counterclockwise relative to the horizontal plane, and the second tilted angle is an angle of tilting the scanning window plane counterclockwise relative to the horizontal plane.

The adjusting the angle of the affine plane of the graphic code according to the angle difference includes: rotating, if the angle difference is a positive value, the affine plane of the graphic code clockwise by the angle difference; or, if the angle difference is a negative value, rotating the affine plane of the graphic code counterclockwise by the angle difference.

In some embodiments, when the computer-executable instruction information stored in the storage medium is executed by a processor, before the angle of the affine plane of the graphic code is adjusted according to the first tilted angle and the second tilted angle, the following step may be performed: determining whether the angle difference is greater than or equal to a preset threshold.

Correspondingly, the adjusting an angle of the affine plane of the graphic code according to the first tilted angle and the second tilted angle specifically includes: adjusting, if the angle difference is greater than or equal to the preset threshold, the angle of the affine plane of the graphic code according to the first tilted angle and the second tilted angle.

In some embodiments, when the computer-executable instruction information stored in the storage medium is executed by a processor, if second tilted angles of scanning window planes of multiple scanning devices relative to the horizontal plane are prestored, the obtaining a prestored second tilted angle of a scanning window plane of each scanning device relative to the horizontal plane includes: determining identification information of a currently used scanning device; and determining, based on the identification information of the currently used scanning device, a second tilted angle of a scanning window plane of the currently used scanning device relative to the horizontal plane among prestored second tilted angles of the scanning window planes of all the scanning devices relative to the horizontal plane.

In some embodiments, when the computer-executable instruction information stored in the storage medium is executed by a processor, the determining the identification information of the currently used scanning device includes: determining a scanning device nearest to a current geographical location, using the nearest scanning device as a currently used scanning device, and obtaining identification information of the currently used scanning device; or communicating, by using a Bluetooth module or a wireless fidelity (WiFi) module of the graphic code display device, with a network device connected to the scanning device to obtain the identification information of the currently used scanning device from the network device.

In some embodiments, when the computer-executable instruction information stored in the storage medium is executed by a processor, the determining a first tilted angle of an affine plane of a graphic code currently displayed by a graphic code display device and the scanning window plane of the scanning device relative to a horizontal plane includes: performing, after it is detected that the graphic code appears and that the graphic code display device is flipped over and stays for a preset time interval, an operation of determining the first tilted angle; and or performing, once it is detected that the graphic code display device is moved after the graphic code appears, an operation of determining the first tilted angle.

When the computer-executable instruction information stored in the storage medium in the embodiment of the present specification is executed by a processor, and when a code is scanned by a scanning device, a first tilted angle of an affine plane of a graphic code currently displayed by a graphic code display device relative to a horizontal plane is determined; a prestored second tilted angle of a scanning window plane of a scanning device relative to the horizontal plane is obtained; and an angle of the affine plane of the graphic code is adjusted according to the first tilted angle and the second tilted angle to reduce an angle between the affine plane of the graphic code and the scanning window plane. In this way, after the scanning device scans the graphic code, the graphic code can be recognized without greatly adjusting the angle of the graphic code, thereby reducing requirements imposed on the scanning device, improving the scanning success rate of the scanning device and reducing the scanning time consumed by the scanning device, and improving user experience.

In the 1990s, improvements of a technology can be clearly distinguished between hardware improvements (for example, improvements to a circuit structure such as a diode, a transistor, a switch, etc.) and software improvements (improvements to a method procedure). However, with the development of technology, improvements of many method procedures can be considered as direct improvements of hardware circuit structures. Designers almost all program an improved method procedure to a hardware circuit, to obtain a corresponding hardware circuit structure. Therefore, it does not mean that the improvement of a method procedure cannot be implemented by using a hardware entity module. For example, a programmable logic device (PLD) such as a field programmable gate array (FPGA) is a type of integrated circuit whose logic function is determined by a user by programming the device. The designers perform voluntary programming to "integrate" a digital system into a single PLD without requiring a chip manufacturer to design and prepare a dedicated integrated circuit chip. Moreover, nowadays, instead of manually making integrated circuit chips, this programming is mostly implemented by using "logic compiler" software, which is similar to the software compiler used in program development and writing. The original code is written in a specific programming language before compiling, and this language is referred to as a hardware description language (HDL). There are various kinds of HDLs, for example, advanced boolean expression language (ABEL), altera hardware description language (AHDL), Confluence, cornell university programming language (CUPL), HDCal, Java hardware description language (JHDL), Lava, Lola, MyHDL, PALASM, Ruby hardware description language (RHDL), and the like. Currently, the most commonly used HDLs are very-high-speed integrated circuit hardware description language (VHDL) and Verilog. A person skilled in the art should also understand that as long as a method procedure is logically programmed and then programmed to an integrated circuit by using the foregoing hardware description languages, a hardware circuit that implements the logical method procedure can be easily obtained.

The controller can be implemented in any suitable manner, for example, the controller can take the form of, for example, a microprocessor or processor and a computer-readable medium storing computer-readable program code (for example, software or firmware) executable by the processor, a logic gate, a switch, an application-specific integrated circuit (ASIC), a programmable logic controller and an embedded microcontroller. Examples of the controller include, but are not limited to, the following microcontrollers: ARC 625D, Atmel AT91SAM, Microchip PIC18F26K20 and Silicone Labs C8051F320. The memory controller can also be implemented as part of the memory control logic. A person skilled in the art will also appreciate that, in addition to implementing the controller in the form of pure computer-readable program code, it is also possible to implement the controller in the form of a logic gate, switch, application-specific integrated circuit, programmable logic controller, and embedded microcontroller and other forms to achieve the same function. Such a controller can thus be considered as a hardware component and apparatuses included therein for implementing various functions can also be considered as structures inside the hardware component. Alternatively, apparatuses configured to implement various functions can be considered as both software modules implementing the method and structures inside the hardware component.

The system, the apparatus, the module or the unit described in the foregoing embodiments can be specifically implemented by a computer chip or an entity or implemented by a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, when the apparatus is described, the apparatus is divided into units according to functions, which are separately described. Certainly, in implementation of the present specification, the function of the units may be implemented in a same piece of or multiple pieces of software and/or hardware.

A person skilled in the art should understand that the embodiments of the present specification may be provided as a method, a system, or a computer program product. Therefore, the present specification may use a form of a hardware-only embodiment, a software-only embodiment, or an embodiment combining software and hardware. In addition, the present specification may use a form of a computer program product implemented on one or more computer available storage media (including but not limited to a disk memory, a CD-ROM, an optical memory, and the like) including computer available program code.

The present specification is described with reference to flowcharts and/or block diagrams of the method, the device (system), and the computer program product in the embodiments of the present specification. It should be understood that computer program instruction information can implement each procedure and/or block in the flowcharts and/or block diagrams and a combination of procedures and/or blocks in the flowcharts and/or block diagrams. These computer program instruction information may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instruction information executed by the general-purpose computer or the processor of another programmable data processing device.

The computer program instruction information may also be stored in a computer readable memory that can instruct the computer or any other programmable data processing device to work in a specific manner, so that the instruction information stored in the computer readable memory generate an artifact that includes an instruction information apparatus. The instruction information apparatus implements a specific function in one or more processes in the flowcharts and/or in one or more blocks in the block diagrams.

These computer program instruction information may also be loaded into a computer or another programmable data processing device, so that a series of operation steps are performed on the computer or another programmable data processing device to generate processing implemented by a computer, and instruction information executed on the computer or another programmable data processing device provide steps for implementing functions specified in one or more procedures in the flowcharts and/or one or more blocks in the block diagrams.

In a typical configuration, the computer device includes one or more processors (CPUs), an input/output interface, a network interface, and a memory.

The memory may include, among computer readable media, a non-persistent memory such as a random access memory (RAM) and/or a non-volatile memory such as a read-only memory (ROM) or a flash memory (flash RAM). The memory is an example of the computer readable medium.

The computer readable medium includes a persistent medium and a non-persistent medium, a removable medium and a non-removable medium, which may implement storage of information by using any method or technology. The information may be computer readable instruction information, a data structure, a module of a program or other data. Examples of computer storage media include but are not limited to a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computing device can access. Based on the definition herein, the computer-readable medium does not include transitory computer readable media (transitory media), such as a modulated data signal and a carrier.

It should also be noted that the terms "include", "comprise" and any other variants mean to cover the non-exclusive inclusion. Therefore, the process, method, article, or device which include a series of elements not only include those elements, but also include other elements which are not clearly listed, or include the inherent elements of the process, method, article and device. Without further limitation, the element defined by a phrase "include one" does not exclude other same elements in the process, method, article or device which include the element.

A person skilled in the art should understand that the embodiments of the present specification may be provided as a method, a system, or a computer program product. Therefore, the present specification may use a form of hardware only embodiments, software only embodiments, or embodiments with a combination of software and hardware. In addition, the present specification may use a form of a computer program product implemented on one or more computer available storage media (including but not limited to a disk memory, a CD-ROM, an optical memory, and the like) including computer available program code.

The present specification can be described in the general context of computer executable instruction information executed by a computer, for example, a program module. Generally, the program module includes a routine, a program, an object, a component, a data structure, and the like for executing a particular task or implementing a particular abstract data type. The present specification can also be practiced in a distributed computing environment in which tasks are performed by remote processing devices that are connected through a communication network. In a distributed computing environment, the program module may be located in both local and remote computer storage media including storage devices.

The embodiments of the present specification are all described in a progressive manner, for same or similar parts in the embodiments, refer to these embodiments, and descriptions of each embodiment focus on a difference from other embodiments. Especially, a system embodiment is basically similar to a method embodiment, and therefore is described briefly; for related parts, reference may be made to partial descriptions in the method embodiment.

The foregoing descriptions are merely embodiments of the present specification and are not intended to limit the present specification. For a person skilled in the art, various modifications and variations can be made to the present specification. Any modification, equivalent replacement, or improvement made without departing from the spirit and principle of the present specification shall fall within the scope of the claims of the present specification.

What is claimed is:

1. A method for displaying a graphic code, comprising:
   determining, by a graphic code display device, a first tilted angle of an affine plane of the graphic code displayed by the graphic code display device relative to a horizontal plane;
   obtaining, by the graphic code display device, a prestored second tilted angle of a scanning window plane of a scanning device relative to the horizontal plane, wherein the graphic code is displayed for the scanning device to scan; and
   adjusting, by the graphic code display device according to the first tilted angle of the affine plane and the second tilted angle, the first tilted angle of the affine plane of the graphic code to reduce an angle between the affine plane of the graphic code and the scanning window plane of the scanning device, wherein adjusting the first tilted angle of the affine plane of the graphic code stretches the graphic code.

2. The method according to claim 1, wherein
   the first tilted angle of the affine plane is an angle clockwise from the horizontal plane to the affine plane, and the second tilted angle is an angle clockwise from the horizontal plane to the scanning window plane; and the adjusting, according to the first tilted angle of the affine plane and the second tilted angle, the first tilted angle of the affine plane of the graphic code comprises: determining an angle difference by subtracting the second tilted angle from the first tilted angle of the affine plane, and adjusting, according to the angle difference, the first tilted angle of the affine plane of the graphic code; or
   the first tilted angle of the affine plane is an angle counterclockwise from the horizontal plane to the affine plane, and the second tilted angle is an angle counterclockwise from the horizontal plane to the scanning window plane; and the adjusting, according to the first tilted angle of the affine plane and the second tilted angle, the first tilted angle of the affine plane of the graphic code comprises: determining an angle difference by subtracting the second tilted angle from the first tilted angle of the affine plane, and adjusting, according to the determined angle difference, the first tilted angle of the affine plane of the graphic code.

3. The method according to claim 2, wherein
   when the first tilted angle of the affine plane is an angle clockwise from the horizontal plane to the affine plane, and the second tilted angle is an angle clockwise from the horizontal plane to the scanning window plane, the adjusting, according to the angle difference, the first tilted angle of the affine plane of the graphic code comprises: rotating, if the angle difference is a positive value, the affine plane of the graphic code counterclockwise to reduce the first tilted angle of the affine plane; or, if the angle difference is a negative value, rotating the affine plane of the graphic code clockwise to increase the first tilted angle of the affine plane; and
   when the first tilted angle of the affine plane is an angle counterclockwise from the horizontal plane to the affine plane, and the second tilted angle is an angle counterclockwise from the horizontal plane to the scanning window plane, the adjusting, according to the angle difference, the first tilted angle of the affine plane of the graphic code comprises: rotating, if the angle difference is a positive value, the affine plane of the graphic code clockwise to reduce the first tilted angle of the affine plane; or, if the angle difference is a negative value, rotating the affine plane of the graphic code counterclockwise to increase the first tilted angle of the affine plane.

4. The method according to claim 2, wherein
   when the first tilted angle of the affine plane is an angle clockwise from the horizontal plane to the affine plane, and the second tilted angle is an angle clockwise from the horizontal plane to the scanning window plane, the adjusting, according to the determined angle difference, the first tilted angle of the affine plane of the graphic code comprises: rotating, if the determined angle difference is a positive value, the affine plane of the graphic code counterclockwise by the angle difference; or, rotating, if the determined angle difference is a negative value, the affine plane of the graphic code clockwise by the determined angle difference; and
   when the first tilted angle of the affine plane is an angle counterclockwise from the horizontal plane to the affine plane, and the second tilted angle is an angle counterclockwise from the horizontal plane to the scanning window plane, the adjusting, according to the determined angle difference, the first tilted angle of the affine plane of the graphic code comprises: rotating, if the angle difference is a positive value, the affine plane of the graphic code clockwise by the determined angle difference; or, rotating, if the angle difference is a negative value, the affine plane of the graphic code counterclockwise by the angle difference.

5. The method according to claim 2, wherein before the adjusting, according to the first tilted angle of the affine plane and the second tilted angle, the first tilted angle of the affine plane of the graphic code, the method further comprises:
   determining whether the angle difference is greater than or equal to a preset threshold; and
   the adjusting, according to the first tilted angle of the affine plane and the second tilted angle, the first tilted angle of the affine plane of the graphic code comprises:
   if the angle difference is greater than or equal to the preset threshold, adjusting, according to the first tilted angle of the affine plane and the second tilted angle, the first tilted angle of the affine plane of the graphic code.

6. The method according to claim 1, wherein if multiple second tilted angles of scanning window planes of multiple scanning devices relative to the horizontal plane are prestored,
   the obtaining a prestored second tilted angle of a scanning window plane of a scanning device relative to the horizontal plane comprises:
   determining identification information of a current scanning device; and
   determining, based on the identification information of the current scanning device, a second tilted angle of a scanning window plane of the current scanning device relative to the horizontal plane among the prestored second tilted angles of the scanning window planes of the multiple scanning devices relative to the horizontal plane.

7. The method according to claim 6, wherein the determining identification information of a current scanning device comprises:
 determining a scanning device nearest to a current geographical location of the graphic code display device, and obtaining the identification information of the determined scanning device; or
 communicating, via a wireless communication channel of the graphic code display device, with a network device connected to the current scanning device to obtain the identification information of the current scanning device from the network device.

8. The method according to claim 1, wherein the determining, by a graphic code display device, a first tilted angle of an affine plane of a graphic code displayed by the graphic code display device relative to a horizontal plane comprises:
 performing, after detecting that the graphic code appears and that the graphic code display device is flipped and stays for a preset time interval, an operation to determine the first tilted angle of the affine plane; or
 performing, when detecting movement of the graphic code display device after the graphic code appears, an operation to determine the first tilted angle of the affine plane.

9. An apparatus for displaying a graphic code, comprising:
 one or more processors, and
 a memory storing instructions executable by the one or more processors to causes the one or more processors to perform operations comprising:
 determining a first tilted angle of an affine plane of the graphic code displayed by a graphic code display device relative to a horizontal plane;
 obtaining a prestored second tilted angle of a scanning window plane of a scanning device relative to the horizontal plane, wherein the graphic code is displayed for the scanning device to scan; and
 adjusting, according to the first tilted angle of the affine plane and the second tilted angle, the first tilted angle of the affine plane of the graphic code to reduce an angle between the affine plane of the graphic code and the scanning window plane of the scanning device, wherein adjusting the first tilted angle of the affine plane of the graphic code stretches the graphic code.

10. The apparatus according to claim 9, wherein
 the first tilted angle of the affine plane is an angle clockwise from the horizontal plane to the affine plane, and the second tilted angle is an angle clockwise from the horizontal plane to the scanning window plane; and the adjusting, according to the first tilted angle of the affine plane and the second tilted angle, the first tilted angle of the affine plane of the graphic code comprises: determining an angle difference by subtracting the second tilted angle from the first tilted angle of the affine plane, and adjusting, according to the angle difference, the first tilted angle of the affine plane of the graphic code; or
 the first tilted angle of the affine plane is an angle counterclockwise from the horizontal plane to the affine plane, and the second tilted angle is an angle counterclockwise from the horizontal plane to the scanning window plane; and the adjusting, according to the first tilted angle of the affine plane and the second tilted angle, the first tilted angle of the affine plane of the graphic code comprises: determining an angle difference by subtracting the second tilted angle from the first tilted angle of the affine plane, and adjusting, according to the determined angle difference, the first tilted angle of the affine plane of the graphic code.

11. The apparatus according to claim 10, wherein
 when the first tilted angle of the affine plane is an angle clockwise from the horizontal plane to the affine plane, and the second tilted angle is an angle clockwise from the horizontal plane to the scanning window plane, the adjusting, according to the angle difference, the first tilted angle of the affine plane of the graphic code comprises: rotating, if the angle difference is a positive value, the affine plane of the graphic code counterclockwise to reduce the first tilted angle of the affine plane; or, if the angle difference is a negative value, rotating the affine plane of the graphic code clockwise to increase the first tilted angle of the affine plane; and
 when the first tilted angle of the affine plane is an angle counterclockwise from the horizontal plane to the affine plane, and the second tilted angle is an angle counterclockwise from the horizontal plane to the scanning window plane, the adjusting, according to the angle difference, the first tilted angle of the affine plane of the graphic code comprises: rotating, if the angle difference is a positive value, the affine plane of the graphic code clockwise to reduce the first tilted angle of the affine plane; or, if the angle difference is a negative value, rotating the affine plane of the graphic code counterclockwise to increase the first tilted angle of the affine plane.

12. The apparatus according to claim 10, wherein
 when the first tilted angle of the affine plane is an angle clockwise from the horizontal plane to the affine plane, and the second tilted angle is an angle clockwise from the horizontal plane to the scanning window plane, the adjusting, according to the determined angle difference, the first tilted angle of the affine plane of the graphic code comprises: rotating, if the determined angle difference is a positive value, the affine plane of the graphic code counterclockwise by the angle difference; or, rotating, if the determined angle difference is a negative value, the affine plane of the graphic code clockwise by the determined angle difference; and
 when the first tilted angle of the affine plane is an angle counterclockwise from the horizontal plane to the affine plane, and the second tilted angle is an angle counterclockwise from the horizontal plane to the scanning window plane, the adjusting, according to the determined angle difference, the first tilted angle of the affine plane of the graphic code comprises: rotating, if the angle difference is a positive value, the affine plane of the graphic code clockwise by the determined angle difference; or, rotating, if the angle difference is a negative value, the affine plane of the graphic code counterclockwise by the angle difference.

13. The apparatus according to claim 10, before the adjusting, according to the first tilted angle of the affine plane and the second tilted angle, the first tilted angle of the affine plane of the graphic code, the method further comprises:
 determining whether the angle difference is greater than or equal to a preset threshold; and
 the adjusting, according to the first tilted angle of the affine plane and the second tilted angle, the first tilted angle of the affine plane of the graphic code comprises:
 if the angle difference is greater than or equal to the preset threshold, adjusting, according to the first tilted angle of the affine plane and the second tilted angle, the first tilted angle of the affine plane of the graphic code.

14. The apparatus according to claim 9, wherein if multiple second tilted angles of scanning window planes of multiple scanning devices relative to the horizontal plane are prestored, the obtaining a prestored second tilted angle of a scanning window plane of a scanning device relative to the horizontal plane comprises:

determining identification information of a current scanning device; and determining, based on the identification information of the current scanning device, a second tilted angle of a scanning window plane of the current scanning device relative to the horizontal plane among the prestored second tilted angles of the scanning window planes of the multiple scanning devices relative to the horizontal plane.

15. The apparatus according to claim 14, wherein the determining identification information of a current scanning device comprises:

determining a scanning device nearest to a current geographical location of the graphic code display device, and obtaining the identification information of the determined scanning device; or communicating, via a wireless communication channel of the graphic code display device, with a network device connected to the current scanning device to obtain the identification information of the current scanning device from the network device.

16. The apparatus according to claim 9, wherein the determining, by a graphic code display device, a first tilted angle of an affine plane of a graphic code displayed by the graphic code display device relative to a horizontal plane comprises:

performing, after detecting that the graphic code appears and that the graphic code display device is flipped and stays for a preset time interval, an operation to determine the first tilted angle of the affine plane; or performing, when detecting movement of the graphic code display device after the graphic code appears, an operation to determine the first tilted angle of the affine plane.

17. One or more non-transitory computer-readable storage media configured with instructions executable by one or more processors to cause the one or more processors to perform operations comprising:

determining a first tilted angle of an affine plane of the graphic code displayed by a graphic code display device relative to a horizontal plane;

obtaining a prestored second tilted angle of a scanning window plane of a scanning device relative to the horizontal plane, wherein the graphic code is displayed for the scanning device to scan; and adjusting, according to the first tilted angle of the affine plane and the second tilted angle, the first tilted angle of the affine plane of the graphic code to reduce an angle between the affine plane of the graphic code and the scanning window plane of the scanning device, wherein adjusting the first tilted angle of the affine plane of the graphic code stretches the graphic code.

18. The one or more non-transitory computer-readable storage media according to claim 17, wherein the first tilted angle of the affine plane is an angle clockwise from the horizontal plane to the affine plane, and the second tilted angle is an angle clockwise from the horizontal plane to the scanning window plane; and the adjusting, according to the first tilted angle of the affine plane and the second tilted angle, the first tilted angle of the affine plane of the graphic code comprises: determining an angle difference by subtracting the second tilted angle from the first tilted angle of the affine plane, and adjusting, according to the angle difference, the first tilted angle of the affine plane of the graphic code; or the first tilted angle of the affine plane is an angle counterclockwise from the horizontal plane to the affine plane, and the second tilted angle is an angle counterclockwise from the horizontal plane to the scanning window plane; and the adjusting, according to the first tilted angle of the affine plane and the second tilted angle, the first tilted angle of the affine plane of the graphic code comprises: determining an angle difference by subtracting the second tilted angle from the first tilted angle of the affine plane, and adjusting, according to the determined angle difference, the first tilted angle of the affine plane of the graphic code.

19. The one or more non-transitory computer-readable storage media according to claim 18, wherein when the first tilted angle of the affine plane is an angle clockwise from the horizontal plane to the affine plane, and the second tilted angle is an angle clockwise from the horizontal plane to the scanning window plane, the adjusting, according to the angle difference, the first tilted angle of the affine plane of the graphic code comprises: rotating, if the angle difference is a positive value, the affine plane of the graphic code counterclockwise to reduce the first tilted angle of the affine plane; or, if the angle difference is a negative value, rotating the affine plane of the graphic code clockwise to increase the first tilted angle of the affine plane; and when the first tilted angle of the affine plane is an angle counterclockwise from the horizontal plane to the affine plane, and the second tilted angle is an angle counterclockwise from the horizontal plane to the scanning window plane, the adjusting, according to the angle difference, the first tilted angle of the affine plane of the graphic code comprises: rotating, if the angle difference is a positive value, the affine plane of the graphic code clockwise to reduce the first tilted angle of the affine plane; or, if the angle difference is a negative value, rotating the affine plane of the graphic code counterclockwise to increase the first tilted angle of the affine plane.

20. The one or more non-transitory computer-readable storage media according to claim 18, wherein before the adjusting, according to the first tilted angle of the affine plane and the second tilted angle, the first tilted angle of the affine plane of the graphic code, the method further comprises:

determining whether the angle difference is greater than or equal to a preset threshold; and the adjusting, according to the first tilted angle of the affine plane and the second tilted angle, the first tilted angle of the affine plane of the graphic code comprises:

if the angle difference is greater than or equal to the preset threshold, adjusting, according to the first tilted angle of the affine plane and the second tilted angle, the first tilted angle of the affine plane of the graphic code.

* * * * *